(12) United States Patent
Leong

(10) Patent No.: US 10,750,838 B2
(45) Date of Patent: Aug. 25, 2020

(54) SYSTEM AND METHOD FOR ACCURATE APPLICATION AND CURING OF NAIL POLISH

(71) Applicant: Coral Labs, Inc., San Mateo, CA (US)

(72) Inventor: Bradley Leong, San Francisco, CA (US)

(73) Assignee: Coral Labs, Inc., San Mateo, CA (US)

( * ) Notice: Subject to any disclaimer, the term of this patent is extended or adjusted under 35 U.S.C. 154(b) by 0 days.

(21) Appl. No.: 16/379,913

(22) Filed: Apr. 10, 2019

(65) Prior Publication Data

US 2019/0313765 A1  Oct. 17, 2019

Related U.S. Application Data

(60) Provisional application No. 62/791,930, filed on Jan. 14, 2019, provisional application No. 62/657,138, filed on Apr. 13, 2018.

(51) Int. Cl.

| | | |
|---|---|---|
| *G06F 3/13* | (2006.01) | |
| *A45D 29/11* | (2006.01) | |
| *A45D 29/22* | (2006.01) | |
| *A45D 34/04* | (2006.01) | |
| *A45D 29/00* | (2006.01) | |
| *A61Q 3/02* | (2006.01) | |

(52) U.S. Cl.
CPC ............ *A45D 29/11* (2013.01); *A45D 29/004* (2013.01); *A45D 29/22* (2013.01); *A45D 34/04* (2013.01); *A45D 2029/008* (2013.01); *A61Q 3/02* (2013.01)

(58) Field of Classification Search
None
See application file for complete search history.

(56) References Cited

U.S. PATENT DOCUMENTS

| | | | |
|---|---|---|---|
| 3,577,582 A | 5/1971 | Aston | |
| 3,739,739 A * | 6/1973 | Brase | B42D 9/008 116/240 |
| 4,596,260 A * | 6/1986 | Giuliano | A45D 31/00 132/73 |

(Continued)

FOREIGN PATENT DOCUMENTS

| | | | | |
|---|---|---|---|---|
| FR | 2998796 A1 * | 6/2014 | ............... | A61K 8/35 |
| JP | 2012085944 A * | 5/2012 | | |

(Continued)

OTHER PUBLICATIONS

International Search Report including Written Opinion for Application No. PCT/US19/26720 dated Jul. 5, 2019, pp. 1-18.

*Primary Examiner* — Ted W Barnes

(74) *Attorney, Agent, or Firm* — Lerner, David, Littenberg, Krumholz & Mentlik, LLP

(57) ABSTRACT

A nail polish application system may include a nail polish applicator to apply a curable nail polish to a nail of a user. An energy source may emit energy to selectively cure the curable nail polish. A sensor may be provided to detect a boundary of the nail of the user. The energy source may be configured to direct the energy to (i) the detected boundary of the nail during a first curing stage or (ii) to an area within the detected boundary of the nail during the first curing stage, and to (iii) avoid directing the energy to an area outside the detected boundary of the nail during the first curing stage.

17 Claims, 31 Drawing Sheets

(56) References Cited

U.S. PATENT DOCUMENTS

| | | | | | |
|---|---|---|---|---|---|
| 4,979,523 | A | * | 12/1990 | Grimm | A45D 29/18 132/73.5 |
| 5,931,166 | A | * | 8/1999 | Weber | A45D 29/00 132/73 |
| 6,336,694 | B1 | * | 1/2002 | Ishizaka | A45D 29/00 347/105 |
| 6,986,442 | B2 | | 1/2006 | Engel et al. | |
| 8,820,866 | B2 | * | 9/2014 | Kasahara | B41J 3/407 347/106 |
| 9,205,672 | B1 | * | 12/2015 | Bitoh | B41J 3/407 |
| 9,629,436 | B2 | * | 4/2017 | Horvath | A45D 29/007 |
| 9,635,923 | B2 | * | 5/2017 | Bitoh | A45D 29/00 |
| 9,687,059 | B2 | * | 6/2017 | Walia | A45D 34/042 |
| 10,231,526 | B2 | * | 3/2019 | Duru | A45D 29/18 |
| 2007/0038270 | A1 | * | 2/2007 | Ferren | A61N 5/062 607/88 |
| 2012/0029417 | A1 | * | 2/2012 | Samain | A61K 8/49 604/20 |
| 2012/0103210 | A1 | * | 5/2012 | Hashimoto | B41J 3/407 101/35 |
| 2012/0103354 | A1 | * | 5/2012 | Park | A45D 31/00 132/200 |
| 2012/0170293 | A1 | | 7/2012 | Terry | |
| 2013/0038648 | A1 | * | 2/2013 | Kasahara | B41J 3/407 347/2 |
| 2014/0161507 | A1 | | 6/2014 | Wong | |
| 2014/0300722 | A1 | | 10/2014 | Garcia | |
| 2015/0173483 | A1 | * | 6/2015 | Raouf | A45D 29/001 132/200 |
| 2015/0182001 | A1 | * | 7/2015 | Yi | A45D 29/00 132/200 |
| 2015/0216284 | A1 | * | 8/2015 | Bitoh | A45D 29/00 132/200 |
| 2015/0335131 | A1 | * | 11/2015 | Ortiz | A45D 29/00 132/73.6 |
| 2016/0052295 | A1 | * | 2/2016 | Legallais | B41J 29/38 358/1.8 |
| 2016/0227900 | A1 | * | 8/2016 | Kumagai | A45D 31/00 |
| 2016/0309877 | A1 | * | 10/2016 | Papshev | A45D 29/00 |
| 2017/0072702 | A1 | * | 3/2017 | Collett | B41J 3/407 |
| 2017/0215550 | A1 | * | 8/2017 | Walia | A45D 29/00 |
| 2017/0232669 | A1 | * | 8/2017 | Watanabe | B29C 67/00 264/496 |
| 2017/0347770 | A1 | * | 12/2017 | Walia | A45D 29/00 |
| 2018/0184780 | A1 | * | 7/2018 | Chevalier | A44C 15/0005 |
| 2018/0196342 | A1 | * | 7/2018 | Miller | G03F 1/42 |
| 2018/0255902 | A1 | * | 9/2018 | Walia | G06T 7/70 |
| 2018/0255903 | A1 | * | 9/2018 | Walia | A45D 34/042 |
| 2018/0263356 | A1 | * | 9/2018 | Cao | H04N 1/3872 |
| 2018/0352933 | A1 | * | 12/2018 | Azuma | A45D 31/00 |

FOREIGN PATENT DOCUMENTS

| | | | | |
|---|---|---|---|---|
| JP | 2012085944 | A | 5/2012 | |
| WO | 2016014132 | A1 | 1/2013 | |
| WO | 2015018987 | A1 | 2/2015 | |
| WO | WO-2016014132 | A1 * | 1/2016 | ............ A45D 29/22 |
| WO | 2016086761 | A1 | 6/2016 | |
| WO | 2017163237 | A1 | 9/2017 | |

\* cited by examiner

SYSTEM AND METHOD FOR ACCURATE APPLICATION AND CURING OF NAIL POLISH

CROSS-REFERENCE TO RELATED APPLICATIONS

This application claims the benefit of the filing date of U.S. Provisional Patent Application No. 62/791,930, titled "SYSTEM AND METHOD FOR ACCURATE APPLICATION AND CURING OF NAIL POLISH" and filed on Jan. 14, 2019, and U.S. Provisional Patent Application No. 62/657,138, titled "SYSTEM AND METHOD FOR ACCURATE APPLICATION AND CURING OF NAIL POLISH" and filed on Apr. 13, 2018, the disclosures of which are hereby incorporated by reference herein.

BACKGROUND OF THE DISCLOSURE

Nail polish is typically applied to finger and/or toe nails by hand using various coats. A first base coat is applied to the nail plate, which may serve to protect the underlying nail, as well as to facilitate adhesion of upper nail polish coats to the nail plate. Following the base coat, one or more color layers are then applied to the base coat on the nail plate. Then, a top coat is applied over the color coat(s) to strengthen and protect the nail polish, which may help the nail polish from chipping, flaking, or otherwise being damaged. When applied in the manner described above, the nail polish typically lasts between two days and a week before beginning to chip and/or flake. Further, when applying a base coat, intermediate color coat(s), and a top coat, the underlying layer may need to mostly or fully dry prior to applying the next layer, which may result in a significant amount of time between application of the base coat and drying of the top coat.

Curable nail polish, which may be referred to as gel nail polish or gel coats, is a type of nail polish that is cured instead of air-dried. For example, an ultraviolet ("UV") curable gel coat may be applied manually and then exposed to UV source, such as a UV lamp or a UV light emitting diode(s) ("LED") to polymerize or otherwise cure the gel coat. The resulting cured gel coat is often stronger than traditional nail polishes, lasting anywhere between one and four weeks before chipping, flaking, and otherwise being damaged. Typically, gel coat applications are performed at salons or other places of business rather than in the home, at least in part due to the additional hardware required to cure the gel polish.

In view of the above, it would be desirable to have a system that provides for easy, rapid, and accurate application and curing of gel polish to desired areas, such as the nail plates of the fingers, either for at-home or in-salon use.

BRIEF SUMMARY

According to a first aspect of the disclosure, a nail polish application system includes a nail polish applicator configured to apply a curable nail polish to a nail of a user, and an energy source configured to emit energy to selectively cure the curable nail polish on the nail. The system may include a sensor for detecting a boundary of the nail of the user, and the sensor may be operatively connected to the energy source. The energy source may be configured to direct the energy to (i) the detected boundary of the nail during a first curing stage or (ii) to an area within the detected boundary of the nail during the first curing stage, and to (iii) avoid directing the energy to area outside the detected boundary of the nail during the first curing stage. In some instances, during the first curing stage, the energy source is configured to apply energy only to positions on the detected boundary of the nail. During a second curing stage after the first curing stage, the energy source may be configured to apply energy to all positions within the detected boundary of the nail.

The nail polish applicator may be configured to apply droplets of the nail polish to the nail of the user. During the first curing stage, the energy source may be configured to apply energy only to positions on the detected boundary of the nail. During the first curing stage, the energy source may be configured to sweep a beam of the energy along the detected boundary. During the first curing stage, the energy source may be configured to apply a constant projection of energy along the detected boundary. The nail polish applicator may be configured to apply the droplets of the nail polish as atomized droplets so that at least a portion of a leading end of the atomized droplets of nail polish is configured to cross the applied energy during the first curing stage. During a second curing stage after the first curing stage, the energy source may be configured to apply energy to all positions within the detected boundary of the nail.

The nail polish applicator may include a reservoir having an interior volume for receiving the nail polish therein and a tip at a distal end of the reservoir. A first lead may be electrically coupled to the nail polish to provide a first charge to the nail polish. A second lead may be configured to have a second charge different than the first charge. A third lead may be positioned proximate the reservoir. The first lead and the second lead may be configured to create an electrical field above a threshold voltage to atomize nail polish exiting the reservoir. The third lead may be configured to be charged so as to direct the nail polish in a direction different from a gravitational direction. Alternatively, the first lead and the second lead may be configured to create an electric field below a threshold voltage to maintain nail polish exiting the reservoir in a non-atomized form.

The energy source may include a UV energy source and the nail polish may be at least partially UV curable. The energy source may include at least one mirror capable of movement in at least one degree of freedom. The energy source may further include a UV energy source to apply UV energy in all directions to non-selectively cure the nail polish. The energy source may include a projector.

The nail polish system may include a structured light system having a projector and light sensor configured to detect energy projected by the projector. The projector of the structured light system may function as the energy source, and the light sensor of the structured light system may functions as the sensor. The structured light system may be configured to assist in detecting curvature of the nail in a depth direction. The sensor may be configured to detect the boundary of the nail of the user periodically to update the detected boundary of the nail over time. The sensor may be configured to detect motion of a finger of the user, the finger containing the nail of the user, in order to (i) update a position of the boundary or (ii) update a shape of the boundary.

According to an aspect of the disclosure, a nail polish application mechanism includes a housing, a first applicator, and a first seal. The housing may have a first side and a second side opposite the first side. The first applicator may be coupled to the first side of the housing and may be impregnated with nail polish resin that is curable by an electromagnetic energy, such as UV light. The first seal may be coupled to the housing, and the first applicator may be positioned within a closed volume defined between the housing and the first seal, the first seal adapted to block the electromagnetic energy, such as UV light, from striking the first applicator while the first seal is coupled to the housing. The first applicator may be directly attached to the first side of the housing. A second applicator may be coupled to the housing and may be impregnated with a wiping solution. The solution may be one in which the nail polish resin is at least partially soluble. In one example, the solution may be an alcohol solution. The second applicator may be directly attached to second side of the housing. The first applicator may extend between a first applicator base and a first applicator tip, the first applicator base being coupled to the first side of the housing.

The housing may include a plurality of first side walls and a first base that together form a first recess, the first applicator base being at least partially positioned within the first recess, and the first applicator tip extending beyond the plurality of first side walls. The first applicator base may be substantially rectangular and the first applicator tip may be rounded or pointed. If included, the second applicator may extend between a second applicator base and a second applicator tip. The second applicator base may be coupled to the second side of the housing. The housing may include a plurality of second side walls and a second base that together form a second recess, and the second applicator base may be at least partially positioned within the second recess, and the second applicator tip may extend beyond the plurality of second side walls. The second applicator base may be substantially rectangular and the second applicator tip may rounded or pointed. The first applicator and/or the second applicator may be an open-cell foam. If the second applicator is included, a second seal may be coupled to the housing, and the second applicator may be positioned within a closed volume defined between the housing and the second seal.

The housing may include a mating mechanism configured to releasably couple to a corresponding mating member of a nail polish application system. The mating mechanism may include three cylindrical protrusions arranged in a triangular configuration. The mating mechanism may alternately include three cylindrical recesses arranged in a triangular configuration.

A nail polish application system may include the nail polish application mechanism described above, and a system housing. A movable member may be movably coupled to the system housing. A mating member may be coupled to the movable member. The housing of the nail polish application mechanism may include a mating mechanism configured to releasably couple to the mating member. Upon coupling the mating mechanism of the nail polish application mechanism to the mating member, the first seal may be broken or otherwise removed. The mating mechanism may include one of a plurality of cylindrical recesses or cylindrical protrusions, and the mating member may include the other of the plurality of cylindrical recesses or cylindrical protrusions. The mating member may be rotatably coupled to the movable member, so that in an installed condition in which the nail polish application mechanism is coupled to the mating member, rotation of the mating member relative to the movable member causes rotation of the nail polish application mechanism about a longitudinal axis of the nail polish application mechanism. The movable member may be movable in one, two, three, or more degrees of freedom of motion.

DETAILED DESCRIPTION

Figure 1:
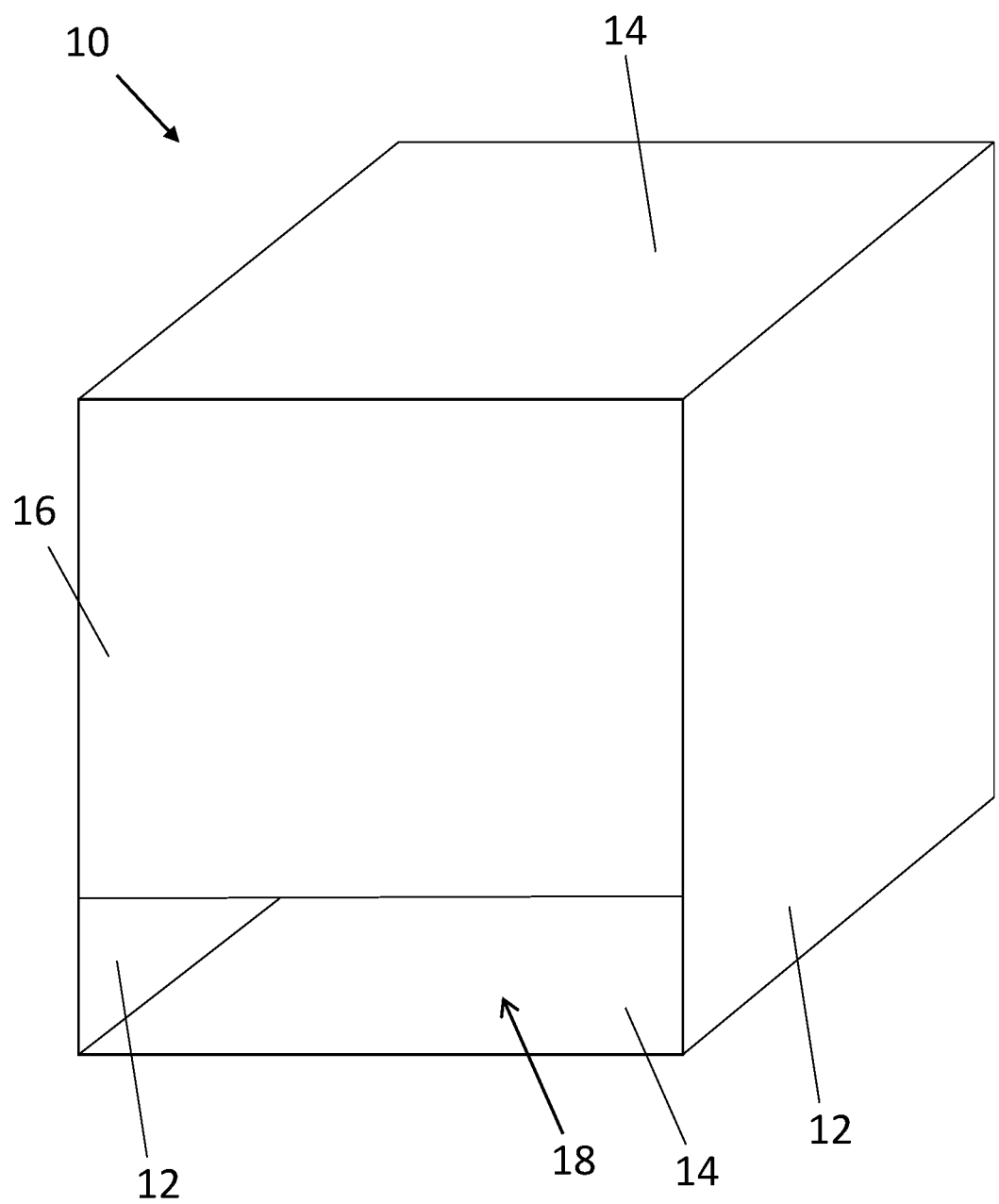
FIG. 1 is a highly schematic view of a housing of a system for providing rapid and accurate application and curing of curable nail polish.

A system for accurately applying and curing a gel coat to the nail plates of the fingers or toes may include a housing 10, as shown in FIG. 1. It should be understood that, as used herein, the term gel coat and gel polish generally refers to any photo-curable nail polish, whether curable by a UV or other source. Housing 10 is illustrated generally as a box with side walls 12, top and bottom walls 14, and front and rear walls 16 (rear wall not visible in FIG. 1). Front wall 16 may extend only partially toward bottom wall 14 so that an opening or other entry 18 is provided. As is described in greater detail below, opening 18 may be sized and shaped so that a user may insert one or more fingers and/or toes into housing 10 so that the nail plates of the finger nails and/or toe nails are completely within the housing. It should further be understood that although illustrated generally as a box, housing 10 may take other suitable forms that house one or more of the components described below and that are suitably shaped to allow for insertion of a user's finger(s) and/or toe(s). In some embodiments, opening 18 is preferably sized so that only a single finger and/or toe is insertable into housing 10 at one time. In other embodiments, opening 18 is preferably sized so that multiple fingers and/or toes are insertable into housing 10 at one time. In one example, entry 18 is sized so that four fingers, including the index finger, middle finger, ring finger, and pinky finger are insertable into housing 10 at the same time, with the thumb intended to be inserted into the housing separately. Similarly, it may be preferable to size opening 18 so that all toes may be simultaneously positioned within housing 10, as it may be difficult to insert only a single toe into the housing at a time. Further, a top (or inner) surface of bottom wall 14 may include one or more grooves, recesses, or texturizations so that a finger(s) or toe(s) inserted therein may readily rest on the bottom wall in a substantially static position. For example, in some embodiments, the top or inner surface of bottom wall 14 may include a single finger or toe-shaped recess or indentation or multiple finger or toe-shaped recesses or indentations. In some embodiments, one or more removable trays may be provided. Removable trays may include recesses, molds, or other features to assist positioning one or more fingers in a desired position. For example, one removable tray may be provided for each finger. In addition, as will be clear from the description below, such removable trays may provide for easier cleanup, for example if excess nail polish is deposited on the removable tray. In other words, rather than excess nail polish being deposited on a bottom surface of housing 14 of housing 10, such excess polish may be applied to the removable tray which may be disposable, or otherwise may be easier to clean by virtue of its ability to be removed. Whether or not removable trays are provided, securing devices may be provided to assist in securing the position of a finger or toe positioned within housing 10. For example, one or more straps may be provided to secure a user's finger in a desired position. Such straps may be simple loops of material, whether rigid or elastic. In other embodiments, straps may be able to be tightened and secured in the tightened condition with known fastener means, for example hook-and-loop fasteners such as those under the tradename VELCRO. Other mechanisms may be provided to assist in maintaining the finger or toe in a desired position. For example, one or more clamping mechanisms may be provided to assist in maintaining the finger or toe in the desired position within housing 10.

Figure 2:
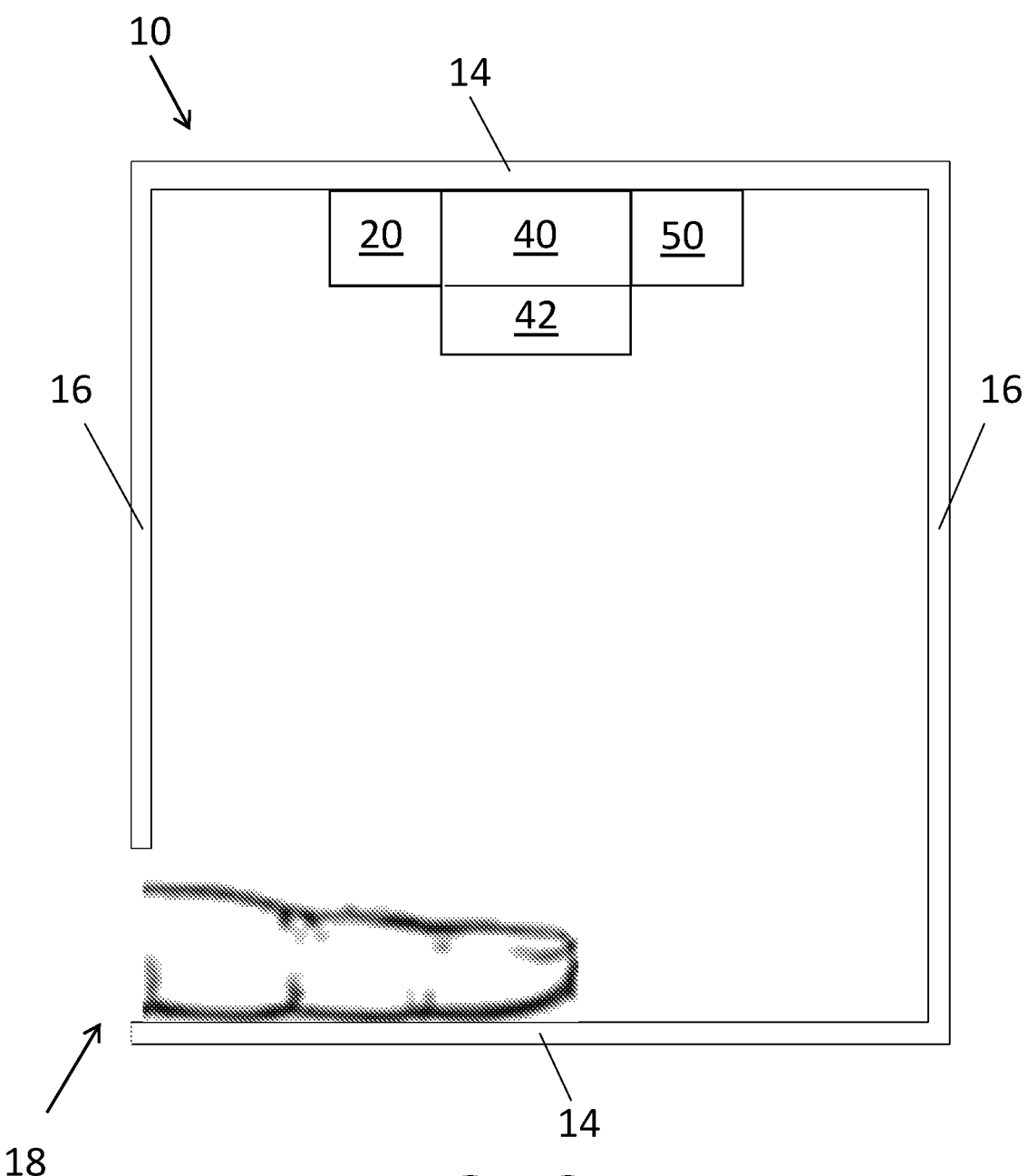
FIG. 2 is a highly schematic cross-section of the housing of FIG. 1 taken along a plane parallel to the side walls of the housing of FIG. 1.

FIG. 2 illustrates a cross-section of housing 10 shown in FIG. 1, the cross-section taken along a plane parallel to the side walls 12 of the housing and extending from the front wall 16 to the back wall. Housing 10 may include a camera 20 or other optical device capable of imaging the finger(s) or toe(s) inserted through opening 18 into the housing. Camera 20 may be operatively connected to shape recognition software or anatomical recognition software configured to identify the outline of a fingernail inserted into housing 10. It should be understood that the term "fingernail" as used herein may also refer to toenails. Any suitable software, including off the shelf software, may be employed to determine boundaries of the nail of the finger and/or toe, including appropriate software available in the open source computer vision library. For example, edge detection computer vision software may be suitable for determining boundaries between the fingernail and the adjacent skin. Other suitable examples may include the use of structured light, a system in which a projector projects a grid or array, such as an array of infrared dots, onto the fingernail, with a camera or other object determining the space between objects in the grid. The use of structured light may assist in providing depth sensing, for example to determine the curvature of the nail in three dimensions (although the curvature of the nail in two dimensions may also be determined). In one example, the grid or array of objects (e.g. dots or lines) may have a known spatial relationship between the objects in the array. When the array is projected from a particular location, the array will deform based on the position and/or distance of the objects within the projection path. The projector may include a reader to view or otherwise "see" the deformed array to assist in determining the three-dimensional contours of the objects onto which the array is projected, or otherwise camera 20 or a similar sensing device may be used to view the projected array to assist in determining depth and surface information of objects onto which the array is projected. As is explained in greater detail below, laser projectors may be provided to assist in curing nail polish, and such laser systems may also be used to assist in depth sensing and/or determining contours of the nail. In other words, if a structured light system is included in the system, the structured light system may include a light sensor which may be separate from, or the same as, the sensor used to detect the boundaries of the fingernail. Similarly, a projector of the structured light system may be separate from, or the same as, the energy source that is configured to cure the nail polish resin.

Figure 3:
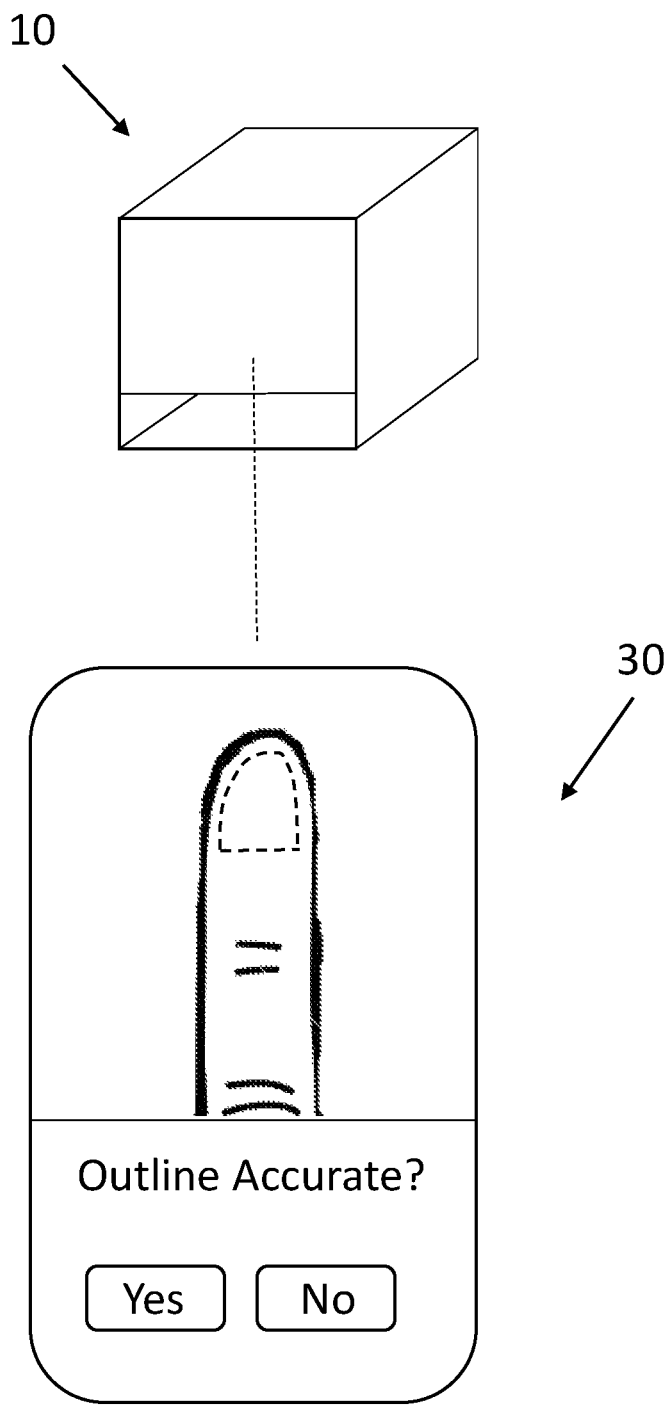
FIG. 3 is a highly schematic illustration of the housing of FIG. 1 connected to a device having an application to assist in using the system for applying and curing the nail polish.

Preferably, camera 20 is operatively connected, e.g. by wires or wirelessly, to an application, such as an application running on a mobile phone or other suitable device with a display. Upon insertion of a finger into housing 10 via entry 18, the user may initiate an application to begin a method for applying and curing gel polish to the fingernail. For example, camera 20 may provide a live feed (or static picture) to a mobile application on a mobile device 30, as shown in FIG. 3. Preferably, anatomical or shape recognition software operatively connected to the camera 20, which may be running on device 30, on software provided with camera 20, or other software otherwise connected to the camera (including software within housing 10), detects the outer edges of the fingernail within housing. The application may overlie the detected outline on the live feed (or static picture) and present the user an option of confirming the accuracy of the detected outline, or otherwise re-initiating the detection process. If the shape detection appears accurate, the user may confirm and continue the method, preferably with little or no movement of the position of the finger within housing 10. In some embodiments, a display serving the same function as device 30 may instead be integrated onto housing 10. In still other embodiments, the detection software may include an algorithm to confirm the shape detection without presenting the user an option of confirming the accuracy of the shape detection. It should be understood that the nail boundary detection may not be solely a single step in which the boundary of the nail is detected, but the detection may be performed periodically, continuously, or substantially continuously so that the boundary of the nail is periodically updated. With such a method, the nail boundary may be rapidly updated over time so that if a user moves his or her finger, the system is able to recognize that movement occurred update the nail boundary accordingly. It should be understood that the speed at which such updating of the nail boundary occurs may be fast enough to provide for real-time or near real-time updates during an application of nail polish, and this continuous or periodic detection may apply to all methods described herein. In other embodiments, instead of or in addition to periodically or continuously updating the detected nail boundary, after an initial detection of the nail boundary, camera 20 or another sensor may track bulk motion of the finger in order to (i) move the nail boundary based on movement of the finger, such as side-to-side translation; (ii) scale the nail boundary based on movement of the finger, such as toward or away from the camera or other sensor; and/or (iii) update the boundary of the nail based on rotation of the finger relative to the camera or other sensor.

Once the outline of the fingernail is confirmed or otherwise detected, an applicator 40 within housing may spray a base coat of photo-curable gel polish onto the fingernail within housing 10. In one embodiment, applicator 40 may include a cartridge or other container housing a volume of the base coat polish that is operatively connected to a nozzle 42 pointed toward the fingernail. The applicator may spray a base coat, for example via aerosol atomization, onto the fingernail, although other methods of application may be suitable, such as electrospray which is described in greater detail below. In some embodiments, nozzle 42 may be configured to spray a volume of base coat to cover a large area sufficient to ensure complete coverage of the fingernail, without taking into account the boundary of the fingernail detected using camera 20. In other embodiments, the applicator 40 and/or nozzle 42 may be operatively connected to the shape detection software to direct the volume and spray area of the nozzle to specifically direct the base coat toward the detected fingernail, and away from the skin. In both cases, it is preferable to ensure coverage of the entire fingernail. As will be described below, any excess spray, for example on the skin of the finger, can be simply wiped off after the base coat is cured. However, it is preferable that the application and curing of the nail polish, as described in greater detail below, is accurate enough to minimize and/or eliminate the need for such wiping of uncured nail polish. If nozzle 42 is operatively connected to the shape detection software to direct the spray of the base coat, it may be coupled to a motor to facilitate the movement of the nozzle. In embodiments in which the applicator 40 and/or nozzle 42 are capable of moving in order to more precisely direct the polish, the applicator 40 and/or nozzle 42 may be coupled to a two- or three-axis motor driven gantry that provides for positioning of the applicator 40 and/or nozzle in any direction in the X and Y axes, for a two-axis gantry, and also in the Z axis, for a three-axis gantry system. It should be understood that any combination of up to three linear degrees of freedom and up to three rotational degrees of freedom may be provided in such positioning systems in order to allow for desired positioning of the applicator 40 and/or nozzle 42.

The applicator 40 and/or nozzle 42 may have any suitable form. For example, the applicator 40 may include one or more re-fillable cartridges that may be filled with the desired polish. In other embodiments, pods or other containers intended for individual use may be used instead. Single-use pods may provide certain advantages. For example, reusable applicators may encounter issues with fluid remaining in the nozzle or in other portions of the applicator following a first use, which may result problems during second and later uses. Single use applicators avoid such issues. Further, single use applicators may useful in terms of color choice, as a desired polish and/or colors may be selected for each individual application.

With the fingernail coated with a layer of uncured base coat, a UV source 50 operatively connected to the shape detection software directs UV energy toward the entire detected area of the fingernail, with the limits of the UV energy application being precisely directed within the detected boundaries. Although source 50 is described as a UV source, it should be understood that other energy sources may be suitable depending on the type of energy required to cure the various gel polish coats. In one example, UV source 50 may be an apparatus (e.g. a stereolithography apparatus, selective light apparatus, laser curing apparatus, etc.) which includes a static UV source directed onto one or more scanning mirrors (preferably two scanning mirrors), the scanning mirrors being motorized and operatively connected to the shape detection software. The scanning mirrors, which may take the form of high speed mirror galvanometers, may move quickly through various positions to reflect UV energy from the UV source toward all positions on the fingernail within the detected fingernail boundary, such that only the base coat within the detected fingernail boundary is cured, and all other base coat (for example any base coat inadvertently applied to the skin of the finger) remains uncured. In other examples, UV source 50 itself may be motorized and moveable such that the UV sources is directed to a single position, with the UV source physically moving along a track or system of tracks such that UV energy is directed to each point within the detected fingernail boundary as the UV sources moves along the track or system of tracks. In this embodiment, the UV source itself (or a component connecting the UV source to the track or system of tracks) may be operatively coupled to the shape detection software in order to direct the UV energy to only the positions within the detected fingernail boundary. It should be understood that the relative positioning of camera 20, applicator 40, nozzle 42, and UV source 50 shown in FIG. 2 is merely provided to illustrate the components, and these components need not be in the positions shown and can be arranged in any desired position, including in some embodiments stacked upon one another. Similarly, although housing 10 is illustrated as fully enclosed other than opening 18, it should be understood that such a configuration may not be necessary. Although in a preferred embodiment, the projection of UV light for curing is performed using a dual galvanometer lase approach, other methods may be suitable. For example, a digital light processing ("DLP") projection system may be a suitable alternative. DLP projection technology may employ an array of mirrors that can be repositioned rapidly to reflect light either to a desired position or onto a heat sink (or light dump). DLP projection technology is generally know and is not described in greater detail herein.

Figure 4:
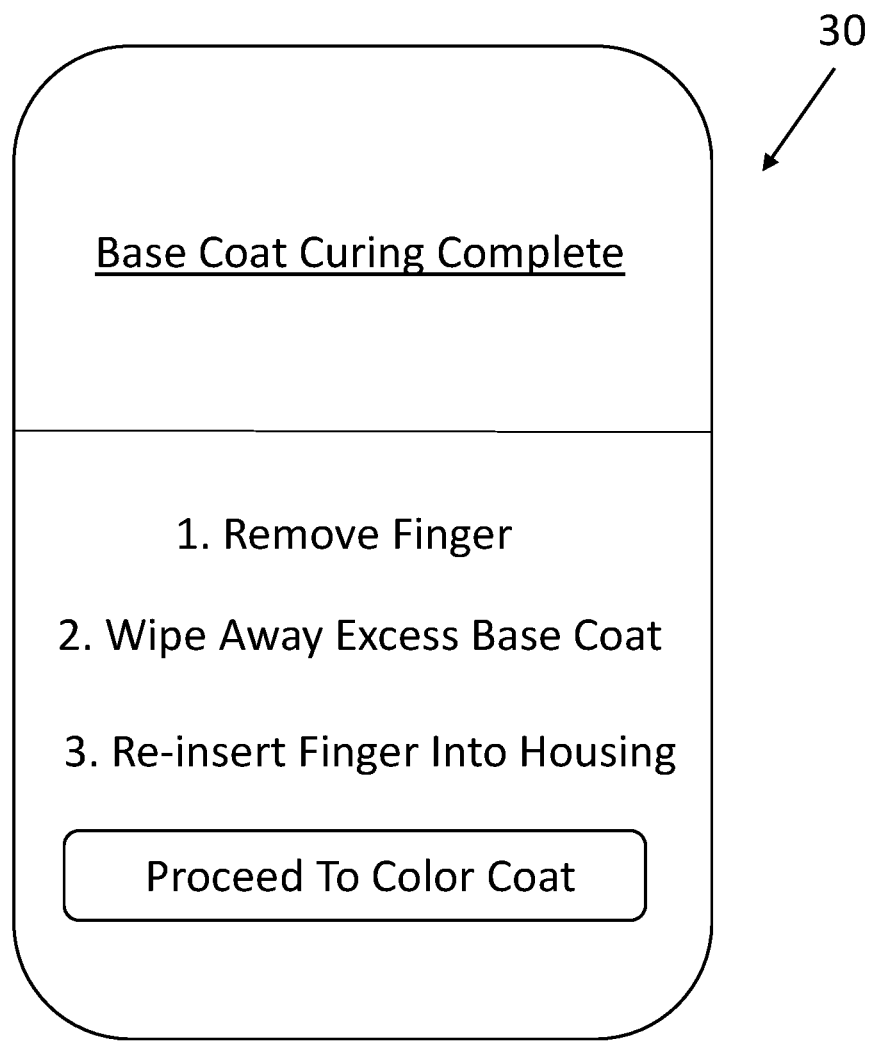
FIGS. 4-6 are examples of information screens that may be provided to a user during use of the system.

Since the curing of the UV-curable base coat may be near instantaneous (e.g. thousands or hundredths of a second) following application of UV energy, the amount of time it takes to cure all of the base coat within the detected fingernail boundaries may mostly be limited by the speed with which the UV source is able to direct UV energy to each point within the detected fingernail boundary. However, it should be understood that other variables, including the power of the energy source (e.g. the power of the laser) and the reactivity of the nail polish, may also affect the curing rate. Once the base coat has been cured by the UV source 50, an indication may be sent to the user. For example, housing 10 may be operatively coupled to an audible signal or a visual signal to indicate completion of the curing. If coupled to a display, such as device 30, software running on the device may display a prompt, as shown in FIG. 4, to the user to remove his or her finger from housing 10, and to wipe off any uncured base coat. If applicator 40 applied the base coat to any areas outside of the detected fingernail boundary, that excess base coat will not have cured because the UV source 50 is limited to transmitting UV energy into the areas within the detected fingernail boundary. As such, the remaining base coat will not have cured and may be readily removed, for example by wiping with a cloth. The user may be instructed to position the finger back inside housing 10 after removal of uncured base coat. However, in other embodiments, the user may leave the finger within housing 10 after curing of the base coat, without removing uncured base coat at this point. Still further, in some embodiments, the application and curing of the nail polish is accurate enough so that no excess nail polish is applied, minimizing and/or eliminating the need for any wiping steps.

If the user removes his or her finger from the housing 10 to remove uncured base coat from the finger, and then re-positions the finger within the housing, the camera 20 may interact with the shape detection software to once again determine the boundary of the fingernail, in the same manner as described above. If the user leaves his or her finger within housing 10, the camera may not need to again detect the boundary of the fingernail, especially if the finger has remained in substantially the same position. In either case, once the finger is within housing 10 and the base coat has been cured and the boundaries of the fingernail are again determined (or otherwise remain determined from a previous step), applicator 40 may spray a second coat, such as a color coat, of photo-curable polish toward the fingernail. Similar to as described above with respect to the application of the base coat, the application of the color coat is preferably completed so that at least the entire detected area of the fingernail is covered with the color coat, with or without aid of a motor to direct nozzle 42 to spray toward the detected fingernail boundary. With the color coat sprayed on top of the cured base coat, UV source 50 again operates to direct curing energy precisely to the areas within the detected boundary of the fingernail. It should be understood that, in some instances, it may be desirable to provide for more than one color coat, in which case the procedure for the second color coat would be substantially identical to the procedure for the first color coat, and so on.

It should be understood that housing 10 may include multiple applicators 40, one for each coat, including the base coat, one or more color coats, and a top coat. Similarly, each applicator 40 may include a dedicated nozzle 42, or a single nozzle may be operatively connected to each applicator. In some embodiments, applicators 40 may be configured to receive pre-filled cartridges of the base coat, color coat(s), and top coat.

Figure 5:
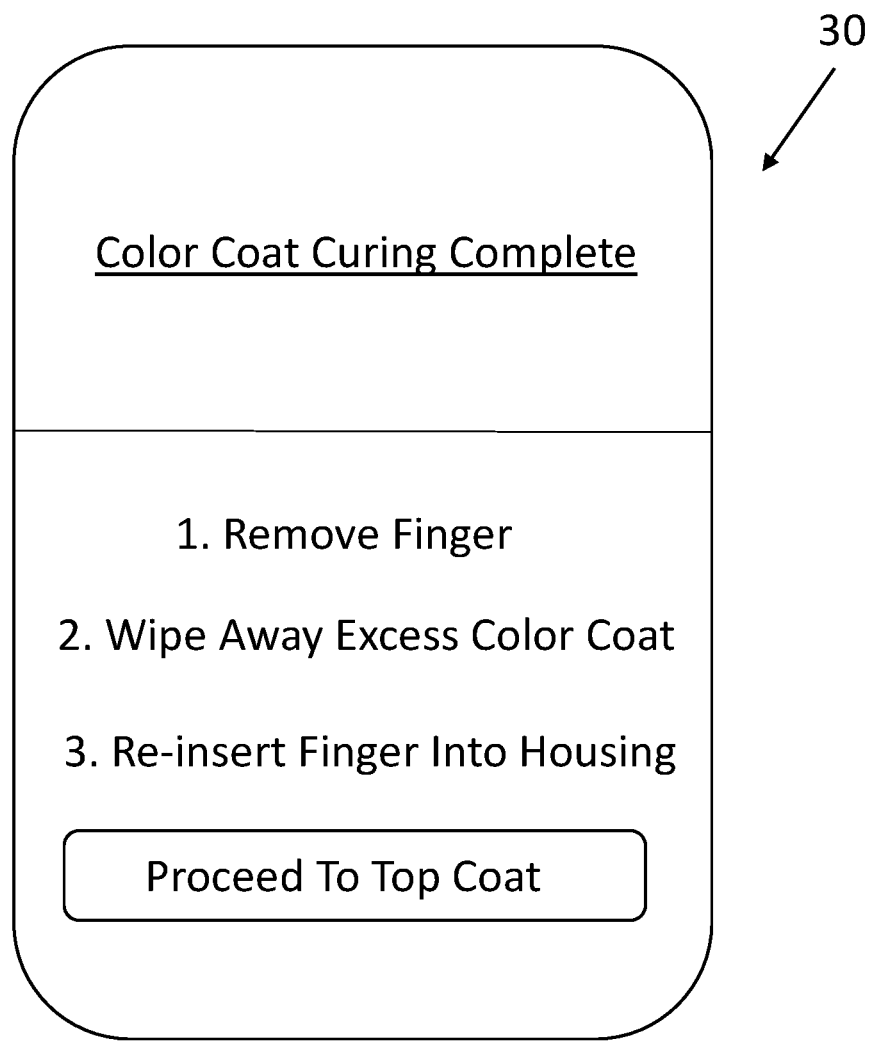

Once the color coat has been cured by the UV source 50, the user optionally may remove his or her finger from housing 10 and wipe off any uncured color coat, re-insert the finger into the housing, and confirm that the camera 20 and connected software again detects the appropriate boundaries of the fingernail. If this step is to be performed, the user may be provided instructions, for example via device 30 as shown in FIG. 5. Otherwise, the user may leave the finger positioned in place after the color coat has cured, which may obviate the need for re-detecting the boundaries of the fingernail, particularly if the finger has not changed positions.

Figure 6:
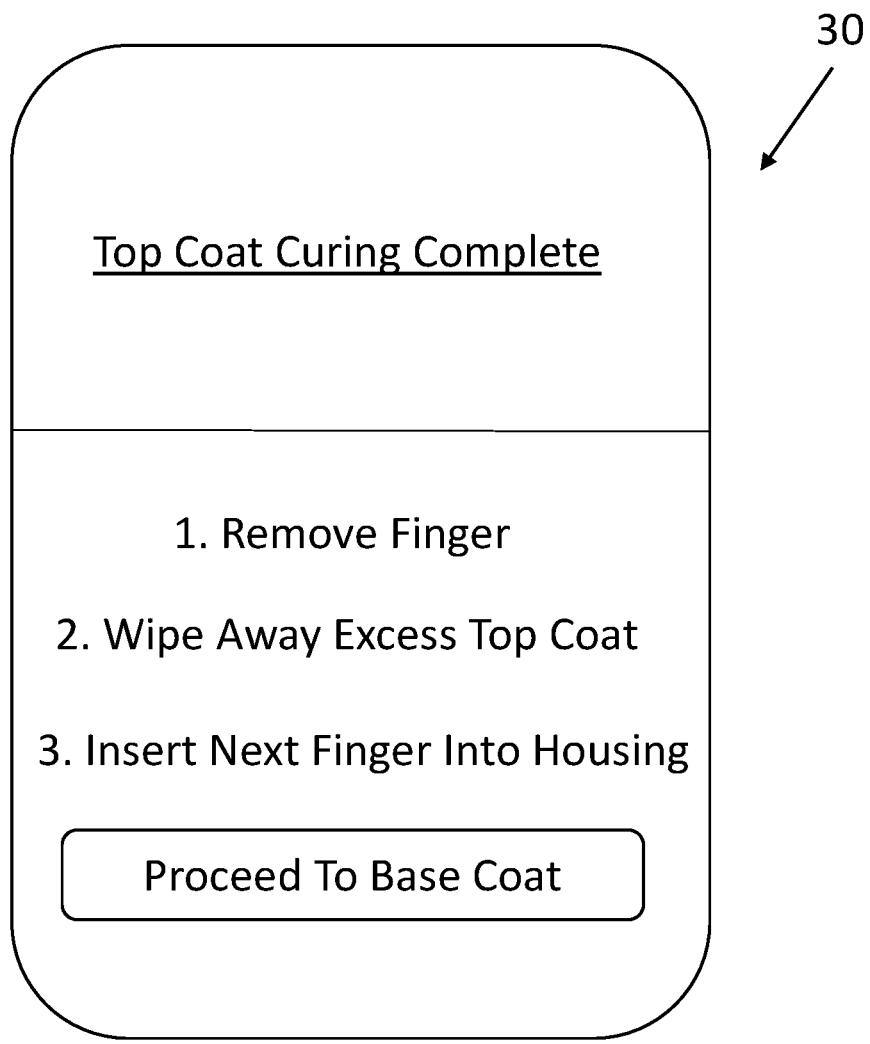

The process may be repeated for a photo-curable top coat, with the top coat being sprayed from an applicator 40 via nozzle 42 to cover at least the areas of the detected fingernail boundary in the same fashion described above for the base coat and color coat. Again, based on the detected fingernail boundaries, UV source 50 may be precisely directed to cure top coat only within the detected boundaries of the fingernail. When the top coat curing is complete, the user may be instructed, for example via device 30 as shown in FIG. 6, to remove his or finger and remove any uncured top coat (as well as any uncured base coat and color coat if the finger has remained within the housing between each coating step) from the finger. As with the base coat and color coat, because only the various coats within the detected boundary of the fingernail have been cured, wiping away uncured coat may be readily performed using a cloth or other cleaning wipe.

In the example provided above, a single fingernail is completed after application, curing, and wiping away uncured base coat, color coat(s), and top coat. After completion of a first finger, the user may be instructed to insert the next finger into the housing, with the process described above completed for the second finger, and the remaining fingers desired to be polished. In other examples, two or more fingers may be inserted into housing 10 at the same time, with the shape detection software detecting each fingernail boundary, and the coats may be applied to and cured for all fingers within the housing prior to proceeding to the next coat. In other words, the base coat may be sprayed onto all fingernails and cured prior to spraying the color coat onto any finger. Still further, although the exemplary method described above is described as requiring user interaction following each coat application, such user interaction may not be required. For example, once the user's finger is positioned within housing 10, the user may perform a single action, such as pressing a button, after which the base coat, color coat(s), and/or top coat may be applied without requiring user interaction between each application. In still other embodiments, the procedure may be fully automated such that the user need not interact with the system at all once the user places his or her finger in the appropriate position.

As should be understood from the above description, the precision of the UV source 50 coupled with the detection of the fingernail boundary and the spray of the various coats to cover at least the entire detected boundary, facilitates an extremely fast and accurate curing of the various nail polish coats that may not otherwise be possible with more conventional gel polish systems.

Figure 7A:
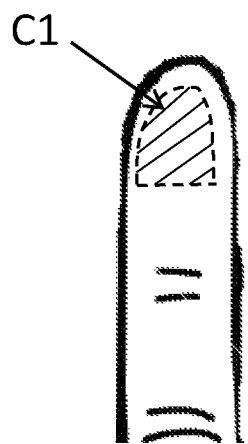
FIGS. 7A-D are exemplary results of color coating at different stages of a multi-step color coating process.
Figure 7B:
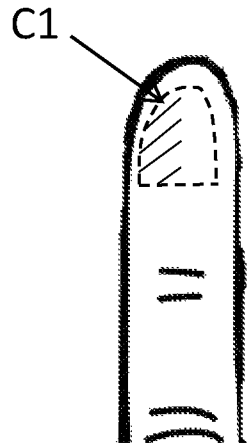
Figure 7C:
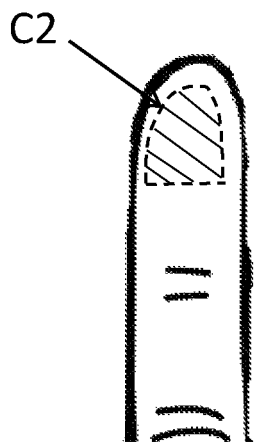
Figure 7D:
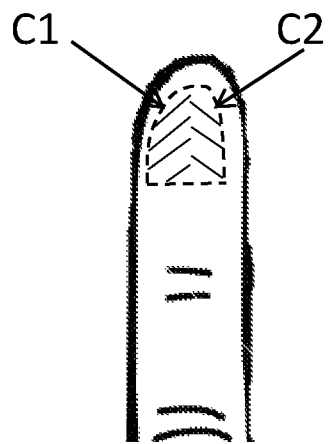

Further, the precision of the UV source 50 may help facilitate various designs within the color coat. For example, as shown in FIG. 7A, after application and curing of the base coat, applicator 40 may spray a first layer of color C1 onto the entire detected fingernail area. However, the UV source may be directed to cure a limited portion of the color coat within the detected fingernail boundary, for example some particular design. In one example, if it is desired to have half the fingernail colored red, and the other half of the fingernail colored green, a red color coat C1 may be first sprayed onto the fingernail, and the UV source 50 directed to cure only half of the fingernail within the detected boundaries. Then, the finger could be removed from the housing and the uncured color coat wiped away, leaving half the fingernail with cured with red color C1, and the other half of the fingernail exposing the previously cured base coat, as shown in FIG. 7B. The finger may be re-inserted into the housing and the fingernail boundary re-detected and/or re-confirmed, and the applicator 40 may spray a second green color coat C2 over the entire area within the detected fingernail boundary as shown in FIG. 7C. Then, the UV source 50 is directed to transmit energy only to the other half of the fingernail within the detected boundary. The user would again remove his or her finger after the second color coat C2 is cured, and wipe of any uncured color coat. Because the green polish C2 sprayed over the previously cured red polish C1 is not cured in the second color curing step, the uncured green polish is easily removed, leaving a fingernail with cured red color coat C1 on one half of the fingernail and cured green color coat C2 on the other half of the fingernail. The finger would then again be re-inserted, and the top coat applied and cured (an uncured top coat wiped away) in substantially the same manner described above. A similar result may be reached with other methods. For example, the first red color coat C1 may be applied and the entire nail cured, and the second color coat C2 applied over the cured first coat, with only half of the second color coat C2 cured, and any excess uncured second color coat C2 wiped off. Still further, the applicators may be precise enough to apply the desired colors only to the desired areas of the nail, with the polish being cured as necessary by the UV source.

Still further, it should be understood that various other designs may be cured by directing the UV source to cure only areas of the most recently applied color coat that are desired to remain in the final design. For example, a first red color coat could be applied and cured on the entire fingernail. A second green color coat could be sprayed over the entire area within the fingernail boundary, but the UV source 50 directed to cure only certain portions of the second green coat to match a particular design. The uncured second green coat within the fingernail boundary may be wiped away, and then either a top coat applied and cured, or a third color coat applied with the UV source 50 being directed to cure only desired portions of the third color coat into the desired design. As should be clear from the above, as many color coats as desired could be applied, with the UV source 50 precisely curing only the desired portions of the relevant color coat to achieve essentially any desired design.

Although any desired color may be available for use in the systems described herein, various methods of color mixing may be used to achieve a large range of colors with various mixing techniques. For example, one or more partially transparent color pigments may be layered on top of one another to achieve a desired mix. In other example, a neutral density transparent layer of polish may be applied on top of a color layer in order to achieve a shade different from the underlying color. For example, a bright red base pigment may be provided in a single-use container, and one or more neutral density transparent layers may be applied over the bright red base to achieve a desired shade different from the base pigment.

It should be understood that, in some embodiments, one or more of the coating steps described herein may be omitted from the process. In other words, skipping or otherwise omitting one or more of the base coat step, the color coat step(s), and the top coat step is still within the scope of the invention. For example, although the base coat and top coat may be generally useful, it is envisioned that the processes described above and below may be performed with only a curable color coat in order to even further reduce the amount of time required to apply a color gel coat to the finger and/or toe nails.

The system(s) and method(s) described above may be modified in various ways in order to provide alternative functionality. For example, two alternative methods of controlling the curing of one or more polish coats are described below and may be referred to as the "border control" method and the "light curtain" method. These embodiments will be described only in the context of application of a single photo-curable color coat, but it should be understood that, similar to the embodiments described above, additional color coats, base coats, and/or top coats would be available for use in addition to a single color coat.

Figure 8A:
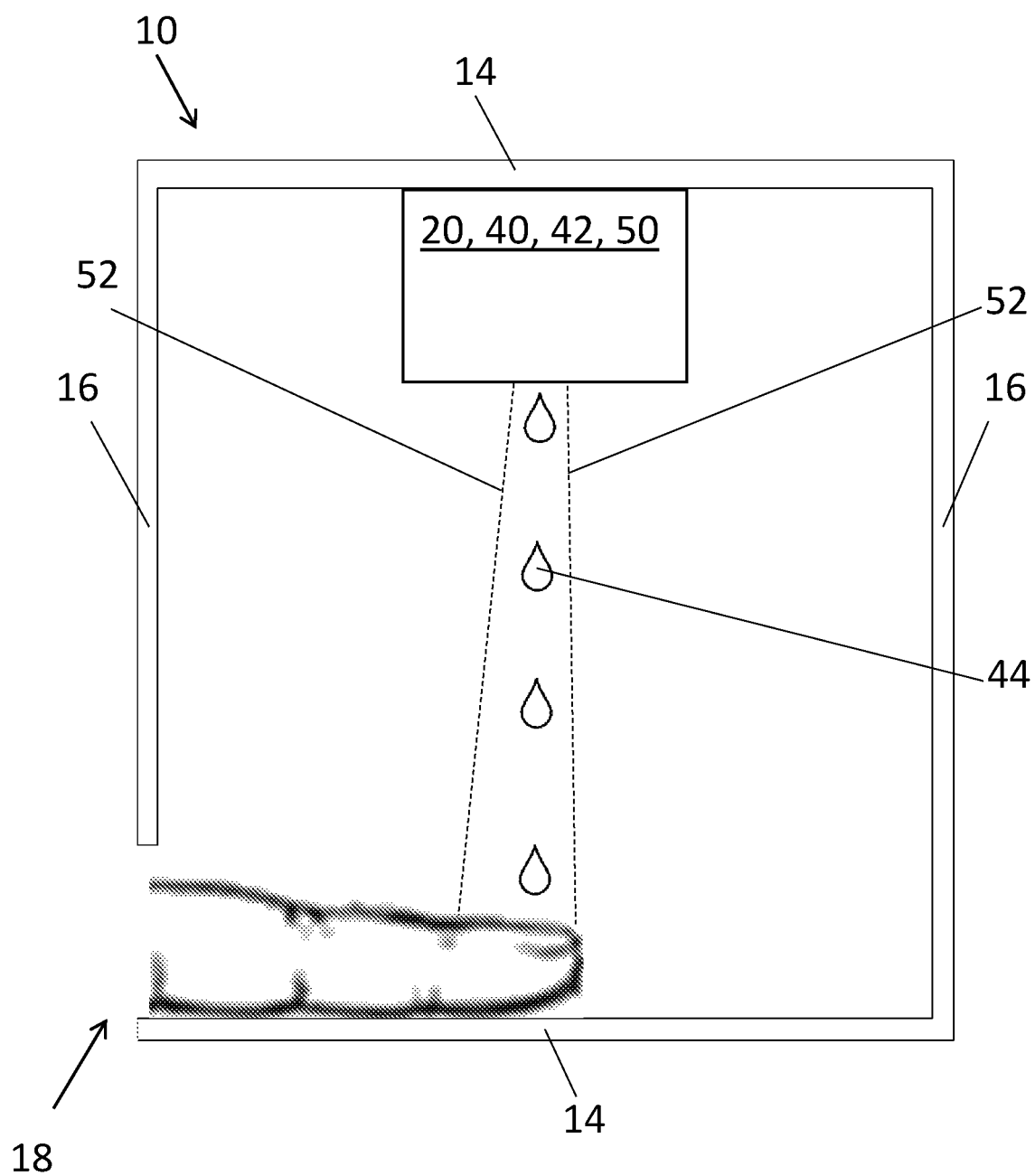
FIG. 8A illustrates a system for a two-stage curing of nail polish using liquid droplets.
Figure 8B:
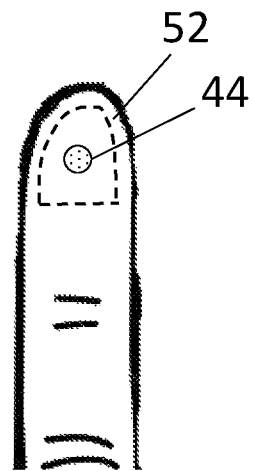
FIG. 8B is a schematic illustration of a liquid droplet applied to a center of a nail.

The border control method is at least partially predicated on the fact that photo-curable nail polish can cure rapidly, particularly if the polish composition includes enough reactants (e.g. the amount of photo-initiator in the formulation), although the entire formulation may be relevant to curing speed. For example, it is feasible to photo-cure some curable nail polishes on the order of milliseconds upon application of the appropriate energy source, such as UV light. FIG. 8A illustrates the housing 10 shown previously with camera 20, applicator 40, nozzle 42, and UV source 50 illustrated schematically as included in a single compartment, although the components need not physically be provided in the same compartment. In the border control method, once the boundary of the nail has been detected (with or without use of a separate screen for confirmation), UV source 50 may provide a UV beam 52 that rapidly sweeps along the detected boundary. As with examples described above, the rapidly sweeping UV beam 52 may be provided with two high-speed rotating mirrors that project or direct the UV beam 52 along the detected nail boundary. Alternatively, a prism or other device could be provided to create an actual wall of UV light extending from the prism to the detected nail boundary. Once the UV beam 52 is sweeping along the detected nail boundary, one or more drops of liquid UV-curable nail polish may be deposited by applicator 40 via nozzle 42. It should be understood that, in the border control methodology described herein, it is preferable that the nail polish be provided in one or more relatively large liquid droplets 44, as opposite to in an atomized or aerosolized spray. The applicator 40 and/or nozzle 42 should be positioned so that, as the droplet(s) 44 travels between the nozzle 42 and the nail plate, the droplet(s) 44 does not cross any active beam 52. Preferably, the droplet(s) 44 is directed to land at or near a center of the nail plate. However, the droplet(s) may be directed to any desired portion of the nail plate, which may or may not include the center of the nail plate. For example, in some embodiments, it may be preferably to provide two droplets on the front and rear halves of the nail plate, respectively, or four droplets in different quadrants of the nail plate. It should be understood that the relative sizes of objects shown in FIG. 8A are not intended to be to scale, and it may be desirable for the distance between the applicator 40 (and/or nozzle 42) and the nail bed of the finger inserted into housing 10 be relatively short to reduce the likelihood of splashing of the polish on contact with the fingernail. A top view of the fingernail with an uncured droplet 44 in an initial position is shown in FIG. 8B.

Figure 8C:
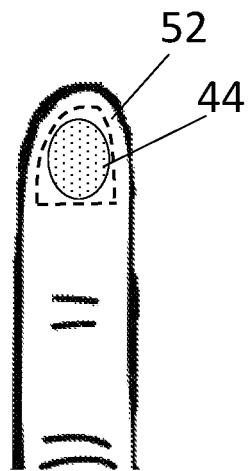
FIG. 8C is a schematic illustration of the liquid droplet of FIG. 8B flowing along the nail.
Figure 8D:
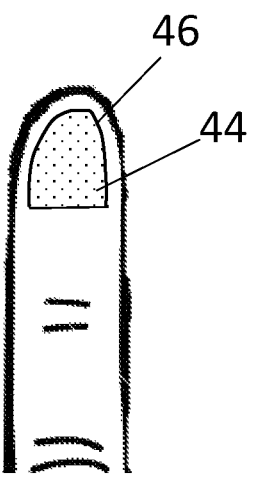
FIG. 8D is a schematic illustration of the edges of the droplet having been cured with the remainder of the droplet remaining uncured.
Figure 8E:
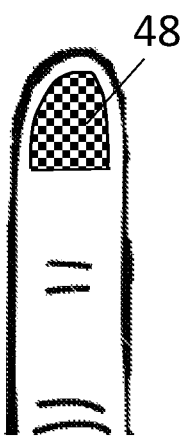
FIG. 8E is a schematic illustration of the remainder of the droplet of FIG. 8D having been cured.

The droplet(s) 44 of nail polish remain in liquid form as it traverses the space between the applicator 40 and the fingernail, since at no point during the path between the applicator 40 and the fingernail does the droplet(s) 44 become cured via the beam 52 of UV energy. Once the liquid droplet(s) 44 contacts the fingernail (e.g. near the center), the droplet(s) 44 will begin to flow toward the edges of the fingernail, as shown in FIG. 8C, due to a combination of gravity, the shape of the fingernail, and the composition of the particular nail polish. As the droplet(s) 44 flows, the UV source is still sweeping the UV beam 52 along the detected edge of the fingernail. Thus, as the leading edges of the flowing droplet(s) 44 reach the edge of the fingernail, the sweeping UV beam 52 contacts the curable nail polish causing it to rapidly harden on the nail at or near the position of the sweeping UV beam 52, as shown in FIG. 8D. The initial result of this border control method is that the portions of droplet(s) 44 that reach the detected edge of the finger nail harden rapidly, providing a raised physical boundary to retain the liquid portions of droplet(s) 44 within the cured polish boundary. The cured nail polish boundary is labeled in FIG. 8D as 46. Once the polish droplet(s) 44 cures around the detected nail boundary, the UV source 50 can direct the UV beam 52 to sweep within the area inside the detected boundary to cure the remaining liquid droplet(s) 44 on the nail plate. In an alternate embodiment, rather than sweeping the UV beam 52 along the area inside the nail boundary, the remaining liquid droplet(s) 44 may be flash cured, for example by exposure to a large amount of UV energy, for example via a UV bulb or other device within housing 50. The resulting fully cured nail polish is illustrated in FIG. 8E and labeled as 48. It should be understood that, because the border control method ensures that no polish—cured or otherwise—is positioned outside the nail boundary, flash curing following the initial border curing does not risk curing any polish onto the user's skin, since all of the polish has been retained within the borders of the nail boundary.

Although in some embodiments of the border control method (and in some embodiments of other methods described herein), the finger of the user may be generally parallel to the floor of housing 10 or otherwise positioned in a plane substantially orthogonal to the direction of gravity, other positions of the finger relative to the floor may be desirable. For example, there may be certain benefits to orienting the user's finger at a downward angle, in other words, at an angle at which the proximal portion of the nail plate closer to the knuckle is positioned higher than the distal portion of the nail closer to the fingertip. Although any angle may be suitable, positioning the nail plate in a plane (or substantially in a plane due the curvature of the nail plate) that is oriented between about 30 and about 60 degrees, including about 45 degrees, relative to the floor may be desirable. With such a downward angle of the fingernail, droplet(s) 44 will tend to advance toward the tip of the finger nail due to gravity, although some amount of the droplet(s) will also likely migrate toward the edges of the nail plate. With such a configuration, any excess droplet(s) 44 may tend to pass beyond the distal tip of the nail plate and runoff the nail plate, including without contacting the skin of the fingertip. If the finger is held fully parallel to the floor, excess droplet(s) 44 may tend to pool up at or adjacent the cured border 46, and positioning the finger at a downward angle may minimize and/or eliminate that possibility. Still further, in some embodiments it may be desirable to apply the uncured polish to the finger nail while the finger is inverted, or in other words where the nail plate is pointing downward in the direction of gravity. With the inverted position, any runoff will fall downward to the bottom of housing 10, which may also minimize and/or eliminate the likelihood of any nail polish contacting the user's skin outside the nail plate. However, it should be understood that in such embodiments, droplet(s) 44 would be applied from a position below the user's finger, and may require propulsion, for example via atomization or other suitable methods described herein. It should be understood that these various finger positions may be applicable not only to the border control method, but the light curtain method described below and any other methods described herein.

It should be understood that, although multiple droplets 44 are shown in FIG. 8, in practice it may be sufficient for a single droplet 44 to include enough volume to cover the entire finger nail. In some embodiments, the applicator 40 may interact with the edge detection software to apply a droplet 44 of a particular size (or a particular number of droplets 44 of a given size) based on the total area within the detected boundary. As a result, applicator 40 may be controlled to deposit a greater volume of nail polish on a larger nail, such as the thumb nail, compared to a smaller nail, such as the pinky nail.

Still further, it should be understood that the particular composition of the nail polish (including the color coat and any base and/or top coats) may be modified to enhance the results of the border control method. For example, for the border control method which applies one or more liquid droplets, it is desirable that the droplet evenly spreads over the surface of the finger nail. One way to control this characteristic, which may be referred to as "sheeting," is to add wetting agents to the nail polish in order to reduce the surface tension of the nail polish. Another characteristic of the nail polish that may be modified is the viscosity. Viscosity generally refers to the internal friction within a fluid causing resistance to flow. If the viscosity of the nail polish is too low, it may flow quickly upon contact with the finger nail which may be undesirable, particularly if the flow is so fast that the polish is able to flow beyond the boundaries of the fingernail prior to the UV beam 52 being able to fully cure the nail polish at the nail boundary. However, low viscosity may only be problematic if the curing process is too long. Thus, if the nail polish has low viscosity, additional reactants (e.g. UV-curable photo-reagents) may be provided in the nail polish to help increase the rate of curing.

Although the border control method described above is described in relation to a two-stage curing method for a single nail polish, it should be understood that the two-stage process may be repeated multiple times for a single nail. For example, the border control method may include a two-stage curing of a base coat, followed by a two-stage curing of one or more color coats, a two-stage curing of a top coat, or any desired combination.

Figure 9A:
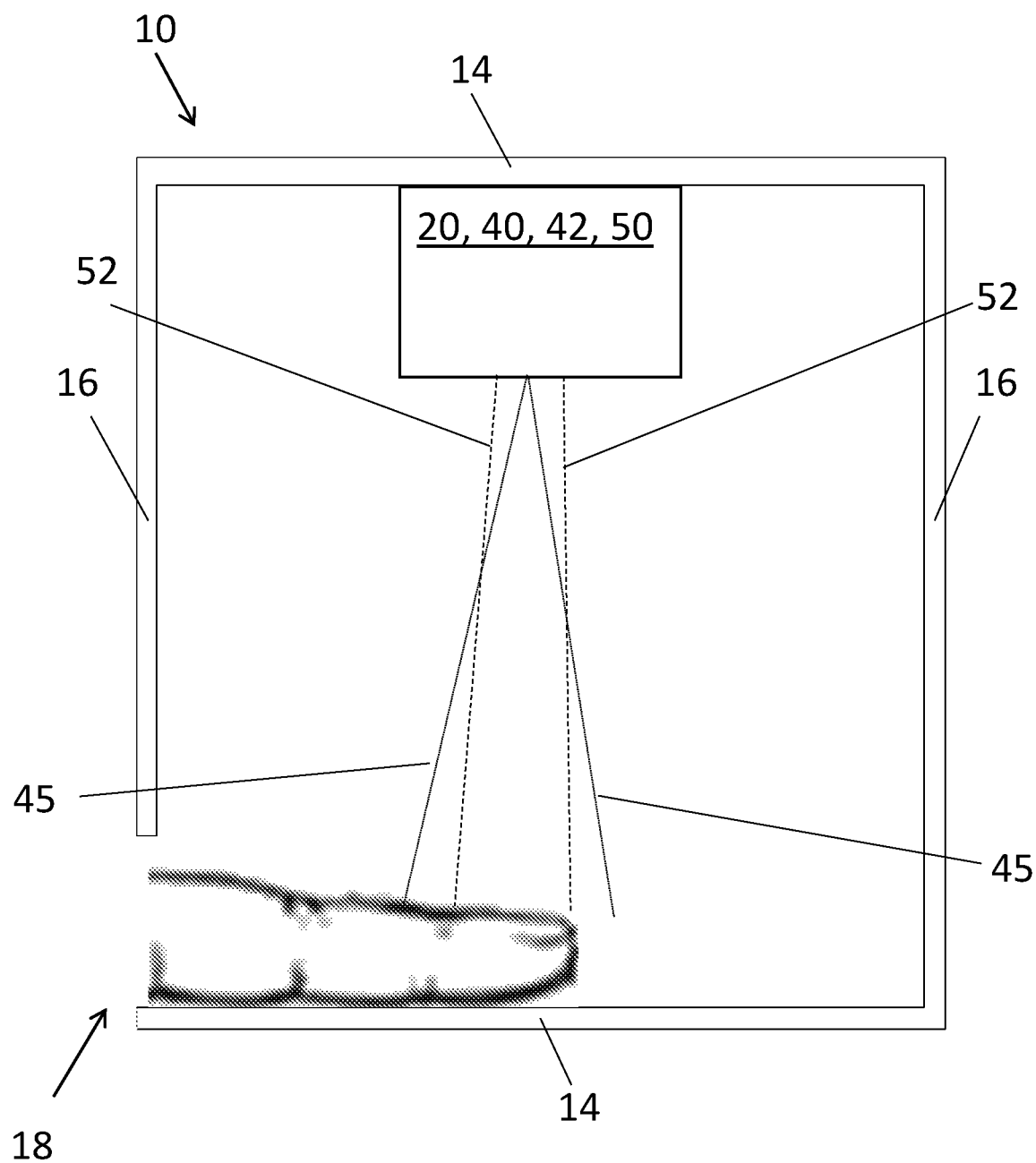
FIG. 9A illustrates a system of two-stage curing of nail polish using atomized nail polish.

As noted above, a second alternative method of applying and curing nail polish is referred to herein as the light curtain method. As with the border control method, the light curtain method is at least partially predicated on the fact that photo-curable nail polish can cure rapidly. FIG. 9A illustrates the housing 10 shown previously with camera 20, applicator 40, nozzle 42, and UV source 50 illustrated schematically as included in a single compartment, although the components need not physically be provided in the same compartment. In the light curtain method, once the boundary of the nail has been detected (with or without use of a separate screen for confirmation), UV source 50 may provide a constant "curtain" of UV light extending from the UV source 50 to the edges of the nail. This curtain may be created in the same way as described above for the border control method, via a UV beam that rapidly sweeps along the detected nail boundary. Alternatively, as with the border control method, a prism or other device could be used to create an actual constant wall of UV light extending from the prism to the detected edges of the nail. For the purpose of further explanation, the light curtain will be referred with part number 52 in the drawings and text, and it should be understood that light curtain 52 may be produced by any suitable method. Once the light curtain 52 is in place, a closed volume is created between the UV source 50, the portions of the nail between the nail boundary, and the light curtain 52. It should be understood that this closed volume is not a physically closed volume, but rather a three-dimensional boundary formed by the light curtain 52 and the portions of the nail within the nail boundary.

Figure 9B:
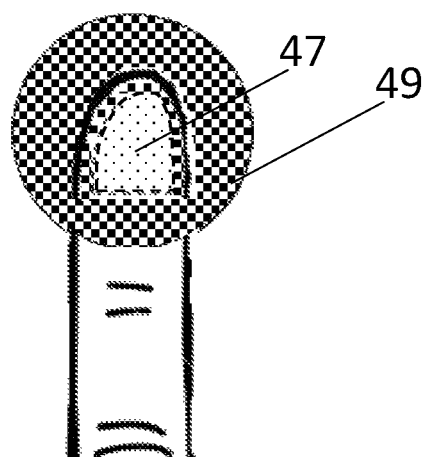
FIG. 9B is a schematic illustration of the result of a first curing step using the system of FIG. 9A.

Whereas the border control method is preferably used with one or more relatively large droplets 44 of liquid nail polish, the light curtain method is preferably used with atomized nail polish, such that the nail polish can be sprayed in a mist 45 of fine particles or droplets. As shown in FIG. 9A, mist 45 preferably originates from a position within the interior volume of the light curtain 52, and when sprayed from applicator 40 and/or nozzle 42, the mist 45 may generally form a conical shape as it sprays toward the nail. The angle of the mist 45 of fine particles is preferably large enough so that, concurrently with or prior to reaching the nail, the mist 45 passes through the light curtain 52. Portions of mist 45 that do not cross the light curtain 52 will land on the nail and remain in an uncured state, as those portions of mist 45 have not yet been exposed to the source energy. The portions of the mist 45 that do cross the light curtain 52, on the other hand, will cure as they cross the light curtain 52. This mid-air curing may occur because the atomized nail polish is in the form of small droplets, and thus are able to rapidly cure as the tiny droplets are exposed to the UV curing energy of the light curtain 52. As a result of this method, after an initial spray of mist 45 of uncured atomized nail polish while the light curtain 52 is active, any atomized nail polish landing on the nail will remain in an uncured state 47, while any nail polish passing through the light curtain and landing elsewhere (such as the skin adjacent the nail plate or a bottom surface of the housing 10) will be in a cured state 49, as those portions have cured prior by the light curtain prior to landing on the particular surface. This is represented schematically in FIG. 9B.

Figure 9C:
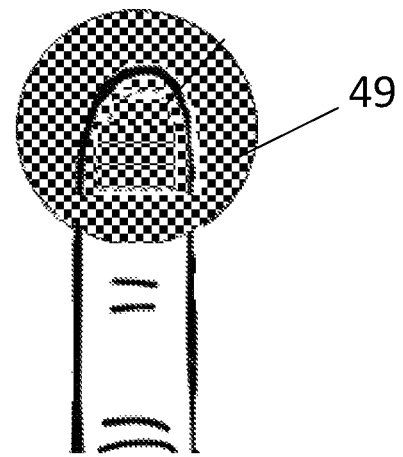
FIG. 9C is a schematic illustration of the result of a second curing step using the system of FIG. 9A.
Figure 9D:
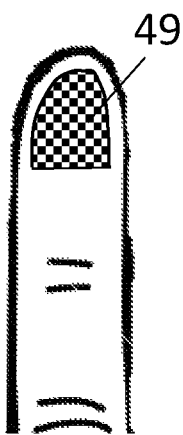
FIG. 9D is a schematic illustration of the end result of a two-stage curing method using the system of FIG. 9A after nail polish cured in the first curing step has been cleaned.

After the initial spray of nail polish in mist 45, a second curing stage may be performed similar to the border control method. For example, a flash cure event may be provided in which a UV bulb or other device indiscriminately cures all of the remaining uncured nail polish within housing 10, or otherwise the high speed mirror galvanometers may pass a UV beam along all the areas at and interior to the detected nail boundary. The result of the second stage curing with all polish in a cured state 49 is represented schematically in FIG. 9C. After the second stage of curing in the light curtain method, the user may remove his or her finger from the housing 10. Any nail polish that landed on the user's skin outside the nail area at this point will be easily removable, as the nail polish was already cured prior to landing on the skin. After the removal of the cured nail polish from the first stage, the result is that the nail polish that was cured after contact with the nail will remain attached to the nail in a cured state 49, as shown schematically in FIG. 9D. This removal of nail polish outside the desired nail boundary may be cleaner or more easily managed compared to (i) cleaning uncured nail polish from the skin, as uncured nail polish may be wet and generally messy and (ii) cleaning nail polish that has been cured to the skin after contact, as that nail polish that has been cured onto the skin may be difficult to remove with a simple wipe of a cloth.

Some conventional photo-curable nail polish gel formulations rely on a free radical curing process that is subject to oxygen inhibition. In conventional nail polish gel applications and curing, this oxygen inhibition may result in the top-most layer of the gel to have a tacky texture because it has been exposed to oxygen which at least partially inhibits the curing, whereas the polish beneath the surface cures more readily as it is exposed to a lower amount of oxygen. As a result, in conventional nail polish gel applications and curing, the top layer may need to be wiped off with a wipe such as an alcohol wipe to remove the top tacky layer, leaving the fully cured underlying gel as the outermost layer. If the system of FIG. 9A is used with atomized nail polish which is inhibited from curing due to the presence of oxygen, the second stage curing process may be suboptimal as the fine particles may have been exposed to a relatively large amount of oxygen as they passed from the nozzle to the nail within the nail boundary. Thus, the second stage curing may be inhibited by exposure of the nail polish to oxygen. However, this negative effect of oxygen inhibition in the system of FIG. 9A may be reduced and/or eliminated by flooding an amount of inert gas, such as argon or carbon dioxide, into the housing 10 prior to the initial spray of atomized nail polish. Still further, if the atomized nail polish is sprayed using a propellant that reduces the ability of oxygen within housing 10 to contact the fine particles of nail polish, the negative effects of oxygen inhibition may be reduced. However, it should be understood that some formulations of curable nail polish may be subject to significantly less oxygen inhibition than other formulations, such that the use of this type of formulation may reduce and/or eliminate the benefits of exposure to inert gases. Still further, in some instances it may be possible to overcome the potential oxygen inhibition by application of enough of the curing energy source (or a large enough power of the energy curing source), such that even formulations of curable nail polish that are prone to oxygen inhibition may be cured with minor or no ill effects from oxygen inhibition, whether or not inert gases are introduced into the system.

In the embodiments described above, the applicator 40 may be used to provide relatively large liquid droplets of nail polish or to propel atomized nail polish in a spray or a mist of very fine particles. In either case, if it is desired to direct the liquid droplets or the atomized spray, a motorized gantry system may be used to move the applicator 40 and/or nozzle 42 in up to six degrees of freedom of motion to a desired position within housing 10. However, in some circumstances it may be desirable to reduce and/or eliminate as many moving parts are possible, while still retaining the ability to direct the nail polish as it exits the applicator 40 and/or nozzle 42. Any of the nail polish application systems described above may include what will be referred to herein as an "electrospray applicator," although it should be understood that the electrospray application is capable of depositing either relatively large liquid droplets as described in connection with the border control method, or an atomized spray of relatively fine particles as described in connection with the light curtain method. However, to be clear, the electrospray concept described below may be applied to any system described herein for depositing nail polish, and may have particular benefits including its relatively low complexity.

Figure 10A:
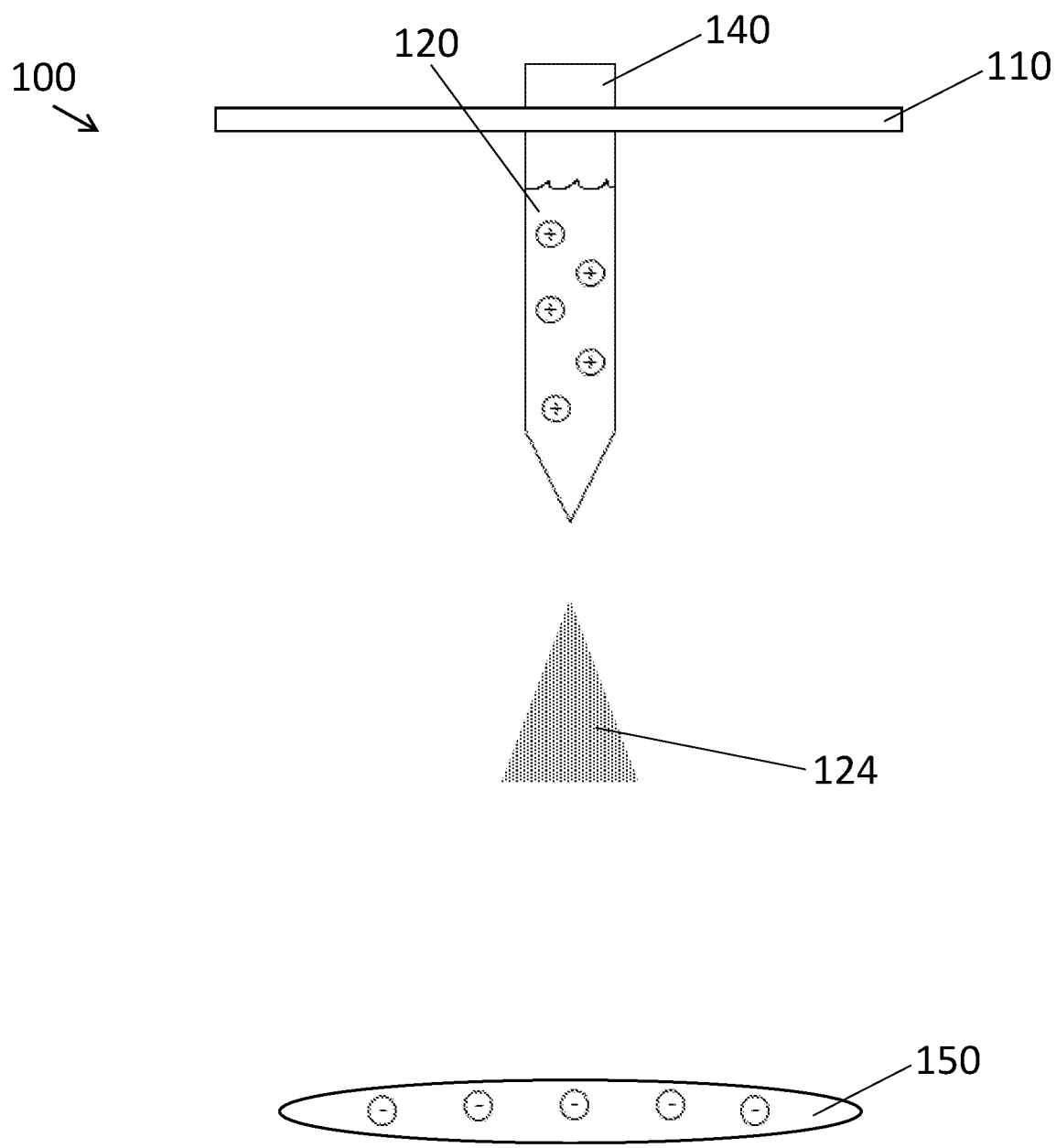
FIG. 10A is a highly schematic illustration of an electrospray applicator that may be used to deposit nail polish.

The general concept of the electrospray method is that, by providing a first charge to a liquid in a container or reservoir such as a syringe, and by placing that charged liquid in proximity to a second object having the opposite charge, the liquid in the syringe may effectively be drawn out of the tip of the container and turned into a mist without requiring a propellant. FIG. 10A illustrates a schematic illustration of an electrospray applicator 100 that can be used with any of the nail polish application systems described above. Electrospray applicator 100 may include a container 140 at least partially filled with the desired nail polish 120 (e.g. photocurable color coat, base coat, or top coat). Container 140 may be a syringe-type device or any other suitable container, preferably with a relatively narrow opening through which liquid may pass. Container 140 is illustrated as being supported by support 110, but it should be understood that container 140 could be supported by any means that stably holds the container 140 in place. For example, container 140 could be coupled to the top of housing 10 directly, via support 110 that extends between two side walls 12 of housing 10, or in any other fashion that secures container 140 with the tip pointing toward the bottom 18 of the housing 10. Preferably, the nail polish 120 is charged with a first charge, for example a positive charge as represented in FIG. 10A. The charge of nail polish 120 may be provided by any suitable mechanism, for example including a positive lead (e.g. cathode) within container 140 or otherwise electrically coupled to nail polish 120 within container 140.

The second main component of the electrospray system is shown as base 150 in FIG. 10A. Base 150 may take the form of any suitable oppositely charged mechanism. In the example in which the nail polish 120 is provided with a positive charge via a cathode, the base 150 may take the form of a charge plate having a negative charge (e.g. anode). Base 150 may be circular or any other desired shape. In the illustrated example, charge plate 150 is provided with a negative charge and helps further draw the positively charged nail polish downward. The electrical charge may be provided to charge plate 150 by any suitable means. In a system similar to housing 10, charge plate 150 may be positioned below where the user would place his or her finger, such that the user's fingernail is positioned above the charge plate 150 and below the container 140. For example, charge plate 150 could be positioned just above, below, or within the bottom wall 18 of housing 10. However, in other embodiments it may be possible to position charge plate 150 above the fingernail, but such a relative positioning may require some portions of the charge plate to be open so that the nail polish 120 may pass to the user's finger nail without being blocked by the charge plate. The proximity between the charged nail polish 120 and the oppositely charged base plate 150 may depend on various factors, but is preferably such that liquid nail polish 120 within the container 140 may be turned into a mist 124 upon exiting the container.

As shown in FIG. 10A, if enough voltage is applied to the cathode and anode to create a charge differential between the liquid nail polish 120 and base plate 150, and if the distance between tip of container 140 and base plate 150 is small enough, the liquid at the tip of the container 140 may form what is known as a Taylor cone, with the liquid turning into a plume or mist 124 as it is expelled from the container 140 toward charge plate 150. As noted above, this allows for liquid nail polish 140 to be turned into a mist 124, if desired, without the need for propellants or the like, which may reduce complexity of the system. It should be understood that the illustration of FIG. 10A is simplified for purposes of explanation, but the general theory regarding electrospray apparatus is known to persons of skill in the art, and the underlying theory is thus not described in significant additional detail herein.

Figure 10B:
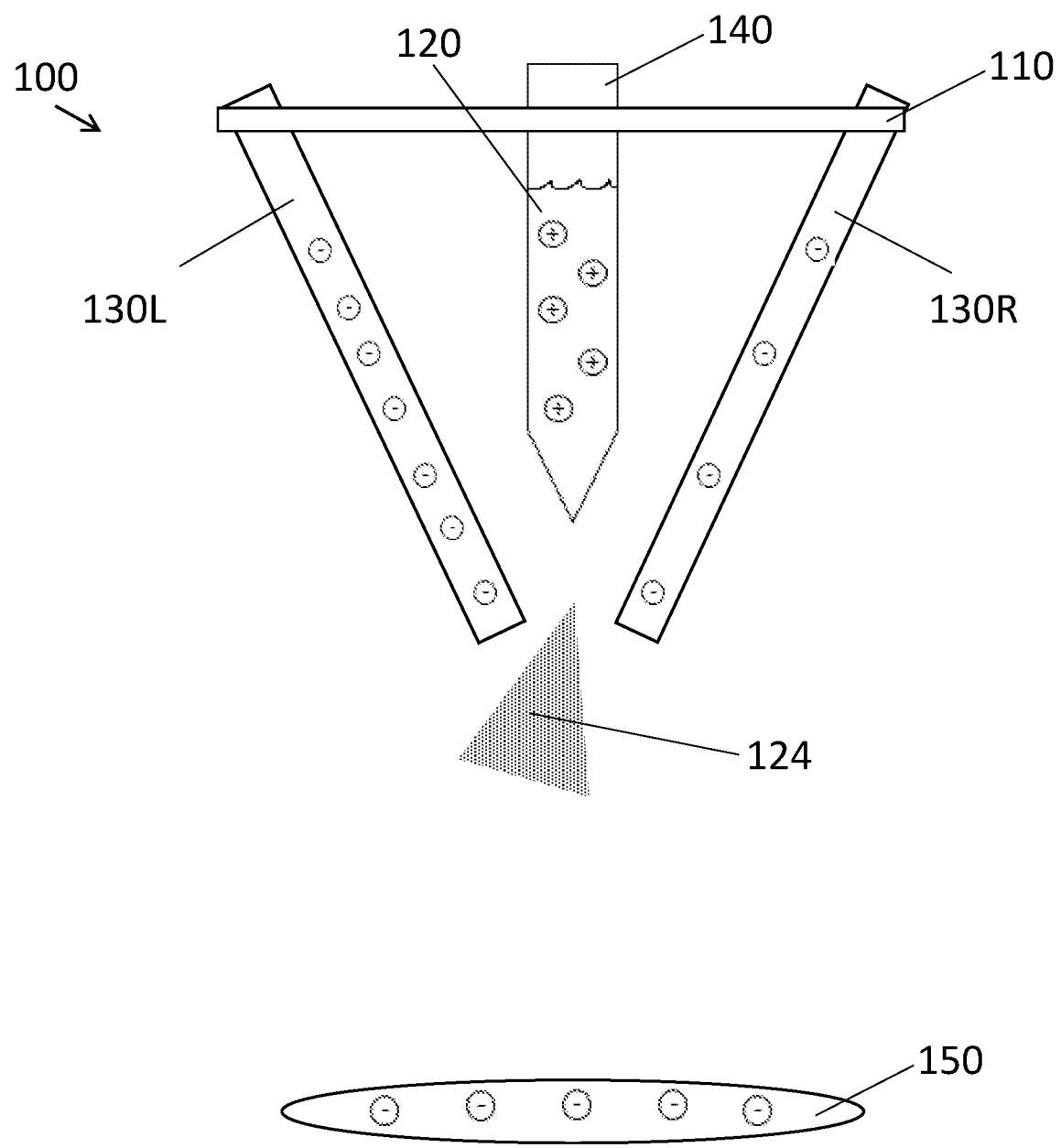
FIGS. 10B-C are highly schematic illustrations of utilizing the electrospray applicator of FIG. 10A to direct the resulting nail polish mist in different directions.
Figure 10C:
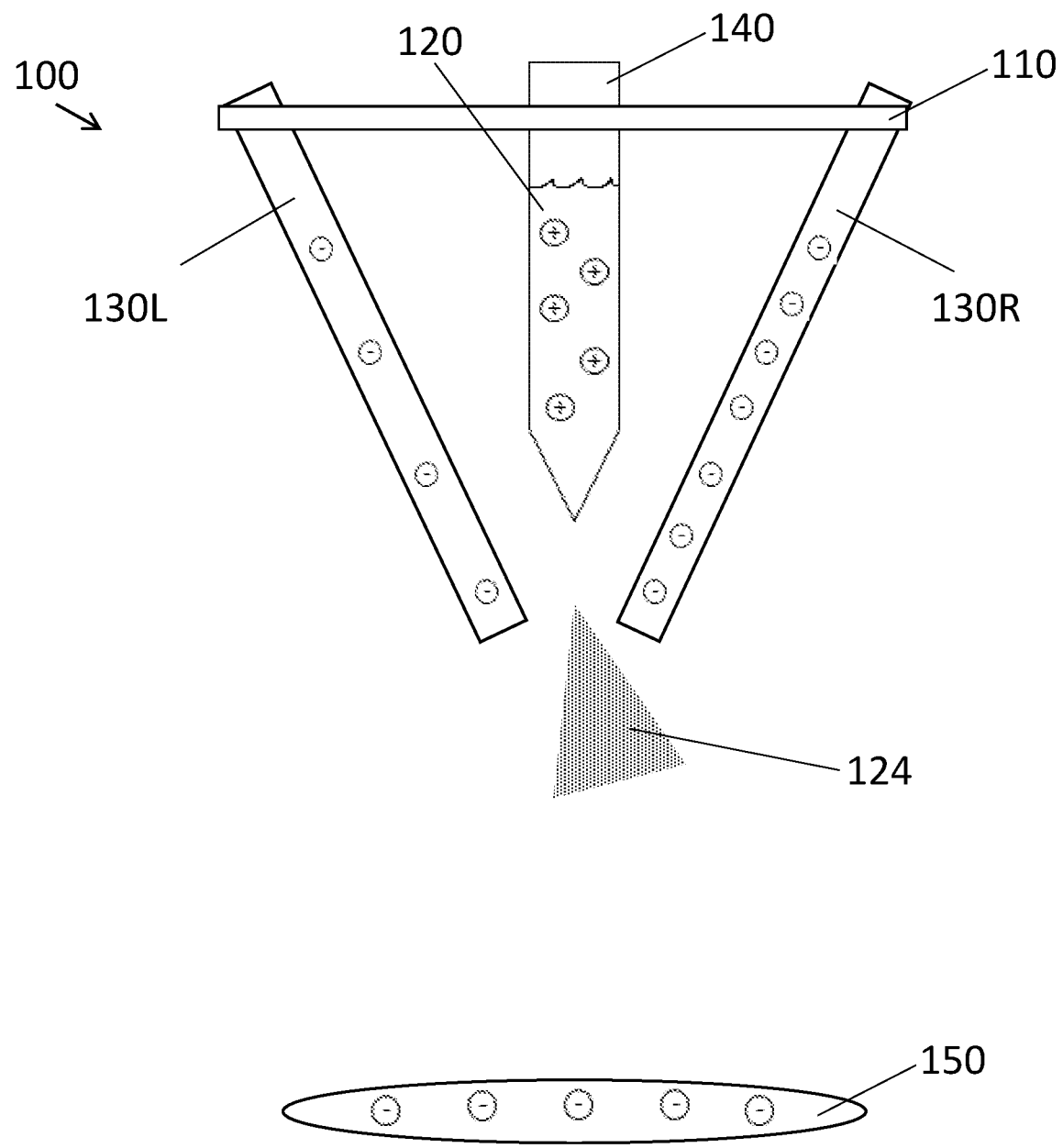

As shown in FIGS. 10B-C, electrospray applicator 100 may additionally include one or more leads positioned at, near, or along the path which the nail polish 120 is expected to flow in the absence of forces other than gravity and/or the opposite charge provided by charge plate 150. In the illustrated example, a first lead 130L is provided in the left side of the drawing, and a second lead 130R is provided in the right side of the drawing. Left and right leads 130L, 130R are illustrated as being secured to support 110, although it should be understood that leads 130L, 130R may be secured in any desirable fashion that allows the tip of the leads to be in the desired position near the flow path of nail polish 120. Left and right leads 130L, 130R may also be provided with charge opposite the charge of the nail polish 120. For purposes of illustration, left and right leads 130L, 130R are illustrated as having a negative charge, similar to charge plate 150, compared to the positive charge of the nail polish 120. Further, in practice the tip of the leads 130L, 130R near the flow path may be where the charge is exposed or concentrated, but for ease of illustration the entire left and right leads 130L, 130R are shown as having a negative charge.

Providing leads 130L, 130R with electrospray applicator 100 may provide the additional ability to direct the nail polish in a particular direction without requiring any moving parts. For example, as shown in FIGS. 10B-C, the left and right leads 130L, 130R may be charged differently to create an electric field which will pull the mist 124 of nail polish 120 in a desired direction. As shown in FIG. 10B, left lead 130L includes a greater charge, so the charged nail polish 120 has a greater attraction in that direction, while FIG. 10C illustrates the opposite scenario. It should be understood that although two leads 130L, 130R are shown in FIGS. 10B-C, additional leads could be positioned at or near the flow path of nail polish 120 to provide more precise control of the directionality of the mist 124 of nail polish 120, although the system could still provide suitable directionality with a single lead instead of the two leads shown. In other words, electrospray applicator 100 is capable of both creating a fine mist of nail polish 120, which may be useful for example in the light curtain method described above, and also directing the mist 124 of nail polish 120 in a desired direction to allow for further precision in the application of the nail polish 120 to a user's nail within housing 100, all without requiring any moving parts such as a gantry system. In addition, although the leads 130L, 130R are illustrated as having an opposite charge of the nail polish 120, resulting in an attractive force that pulls the nail polish toward the leads, it may be preferable for leads 130L, 130R to provide directionality via a repulsive force. For example, if nail polish 120 has a positive charge, it may be preferable that leads 130L, 130R have a positive charge to direct the nail polish 120 via repulsion. Using a repulsive force may reduce the likelihood that any of the nail polish 120 gets pulled in a direction back against gravity after first passing the leads 130L, 130R.

Figure 10D:
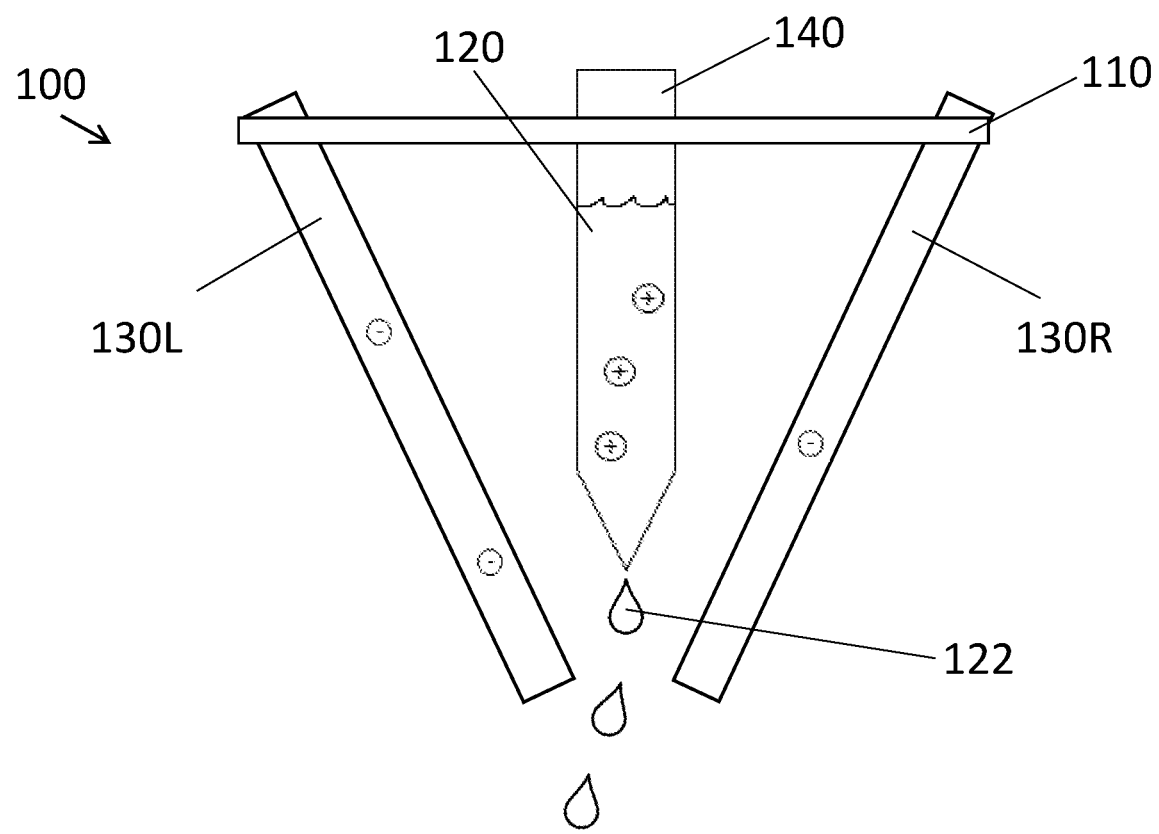
FIGS. 10D-E are highly schematic illustrations of utilizing the electrospray applicator of FIG. 10A to direct a droplet of nail polish in different directions.
Figure 10D:
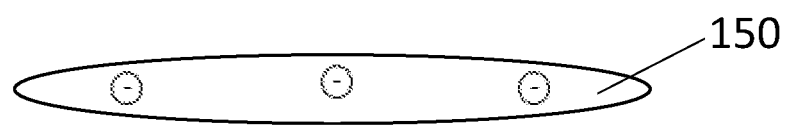
Figure 10E:
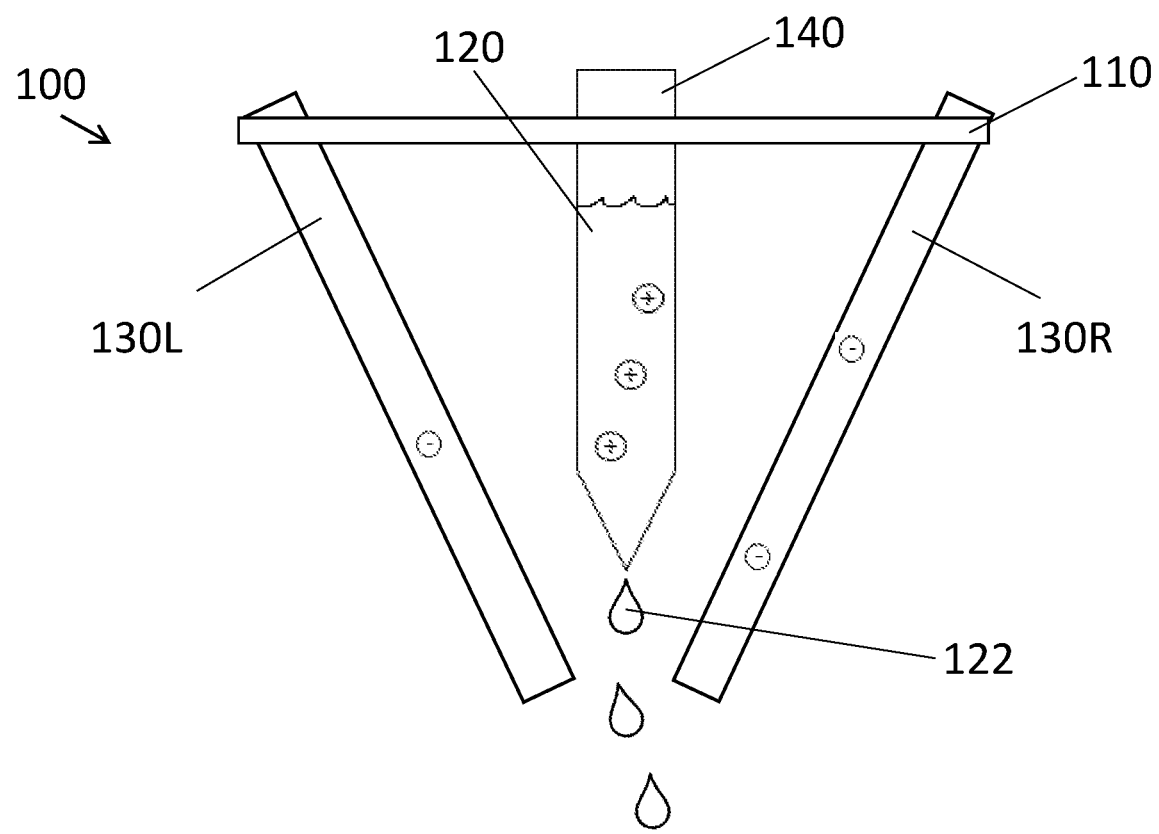
Figure 10E:

Still further, it should be understood that if the voltage supplied to nail polish 120 and/or charge plate 150 is small enough, the electric field created may not result in the nail polish 120 turning into a mist 124 as explained in connection with FIGS. 10A-C. Rather, if the difference in charge between the nail polish 120 and the charge plate 150 is below the threshold to create mist 124, the nail polish 120 may exit the container 140 in a non-atomized form such as a relatively large droplet 122, as shown in FIGS. 10D-E. However, leads 130L and 130R may still be provided with a charge opposite to that the droplet 122 to cause a change in direction depending on the particular electric field. For example, as shown in FIG. 10D, the charge differential between the nail polish 120 and the charge plate 150 is small enough such that the nail polish 120 remains in the form of a droplet(s) 122 as it exits the tip of the container 140. However, the charge applied to leads 130L, 130R is such that the electric field attracts droplet 122 in a direction toward left lead 130L. Similarly, as shown in FIG. 10E, an electric field may be produced below the threshold, but still able to pull droplet 122 to the right. It should again be understood that more leads may be provided to allow for further precision in directing a droplet 122 to a position on a user's fingernail positioned between charge plate 150 and container 140. It should be understood that, although the term electrospray applicator is used, in the use shown and described in connection with FIGS. 10D-E, a "spray" may not actually be created, but the term is still used in this context for consistency with the similar physical configuration described in connection with FIGS. 10A-C. It should further be understood that electrospray apparatus 100 may be used with the border control method described above to allow for relatively large droplets of nail polish to be directed onto a user's fingernail, with the precision of deposition increased by the ability to change the direction of the droplet 122 between the point of exiting container 140 and landing on the user's nail. However, as noted above, any of the electrospray configurations described herein may be applied to any other method described herein for applying and/or curing nail polish.

Electrospray applicator 100, and similar alternatives (for example including more leads or different mechanisms of securing the leads and/or container) may be implemented with any of the nail polish systems described above, for example in place of the applicator 40 and/or nozzle 42 described in housing 10. The electrospray applicator 100 may further be used with any of the methods of depositing and curing nail polish described above, including methods which use relatively large droplets and methods that use relatively fine particles or mists/sprays. Still further, electrospray applicator 100 may be formed in different configurations to provide similar results. In one example, instead of having a charge plate 150 for the purpose of creating a mist, and separate leads 130L, 130R for the purpose of directing charged liquid in a desired direction, these features could be combined. For example, a single charge element in the shape of ring or another similar shape with an open interior may be provided in a position between the user's finger nail and the container 140. With such ring element, voltage may be applied in sufficient quantity to cause the nail polish 120 (which has an opposite charge) to turn into a mist upon exiting the container 140. The open interior space of the ring element would allow the mist to pass through the ring element and to be deposited onto a user's finger nail positioned below. Still further, the ring element could be provided with a non-uniform charge around the circumference in order to direct the mist passing through the ring. This may be achieved in any suitable way, for example by providing various individual anode elements along the circumference of the ring that can be individually charged to create any desired charge gradient along the ring.

It should be noted that the electrospray concept may be used with relatively large voltages, for example in the thousands of volts, which may be generally atypical of consumer electronics. However, it should be noted that high voltages may not create a significant safety issue, as the electrospray system may be used with very small amounts of current that do not pose danger to the user. However, there may be a minimal concern of applying a charged particle to the nail and/or skin of a user. In the examples described above, nail polish 120 is illustrated as having a positive charge. However, as noted above, the electrospray system would work effectively in the same way if the nail polish 120 is provided with a negative charge and the charge plate 150 (and/or leads 130L, 130R) are provided with a positive charge. In order to reduce and/or eliminate the concern about depositing a charged particle onto a user, the charges of the nail polish 120 and charge plate 150 may be oscillated such that, during one or more portions of the application, nail polish 120 has a positive charge and charge plate 150 has a negative charge, and then in one or more other portions of the application, nail polish 120 is reversed to have a negative charge and charge plate 150 is reversed to have a positive charge. With this configuration, the net charge of particles of nail polish 120 applied to the user may be zero or near zero to reduce and/or eliminate any concern of a charge buildup occurring by deposition of a charged particle onto the user.

Although the various embodiments of curing a photocurable nail polish have been described above as a flash curing process or curing via an energy source having a scanning pattern, other curing methods are possible. For example, in any of the embodiments described above, a first polish (e.g. a base coat or a polish having a first color) may be only partially cured, with a second polish (e.g. a top coat or a polish having a second color) being applied to the partially-cured first polish, followed by a complete cure. This process may provide for different aesthetics, for example swirling-type of color patterns. In other examples, particular scanning patterns of the curing energy may be applied to achieve different results, for example different textures. In one example, the polish may be cured via a laser scan pattern that cures as it sweeps along a first "line," and then cures along a second "line" parallel to the first line, leaving a gap between the two lines. The uncured polish between the two cured "lines" may form a meniscus, and if that uncured polish is then cured while having the meniscus, a different texture quality may result compared to, for example, a flash curing process.

Figure 11A:
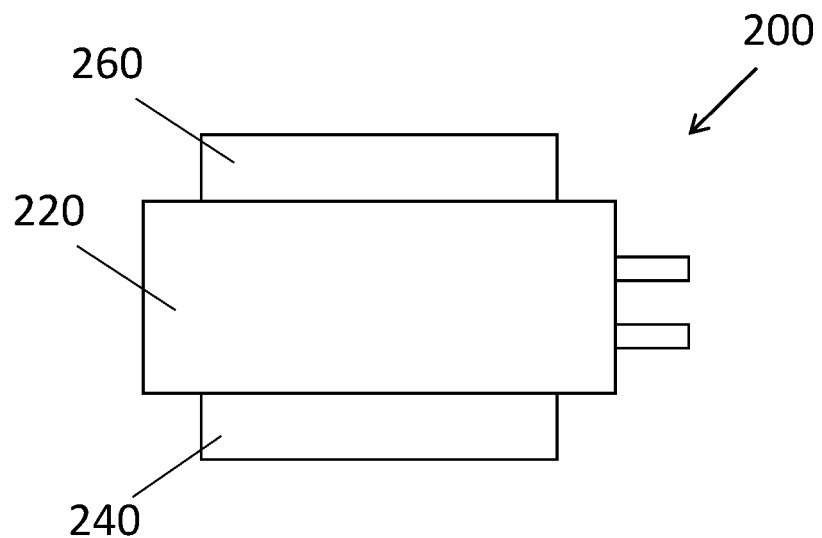
FIGS. 11A-B are side and front views, respectively, of a nail polish application mechanism.
Figure 11B:
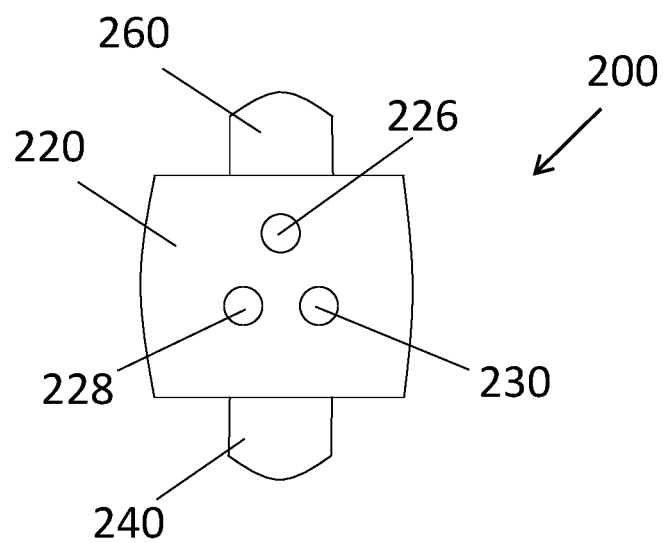

Various mechanisms for depositing uncured nail polish resin onto a user's nail have been described above, for example including aerosol and electrospray techniques. However, still other mechanisms may be suitable. FIGS. 11A-B illustrate side and front views, respectively, of an application mechanism 200 that may be used with one or more of the systems described above to apply a nail polish resin to a user's nail. Generally, application mechanism 200 may include a housing 220, a first applicator 240, and a second applicator 260, although it should be understood that a single applicator may be used instead of multiple applicators.

Figure 11C:
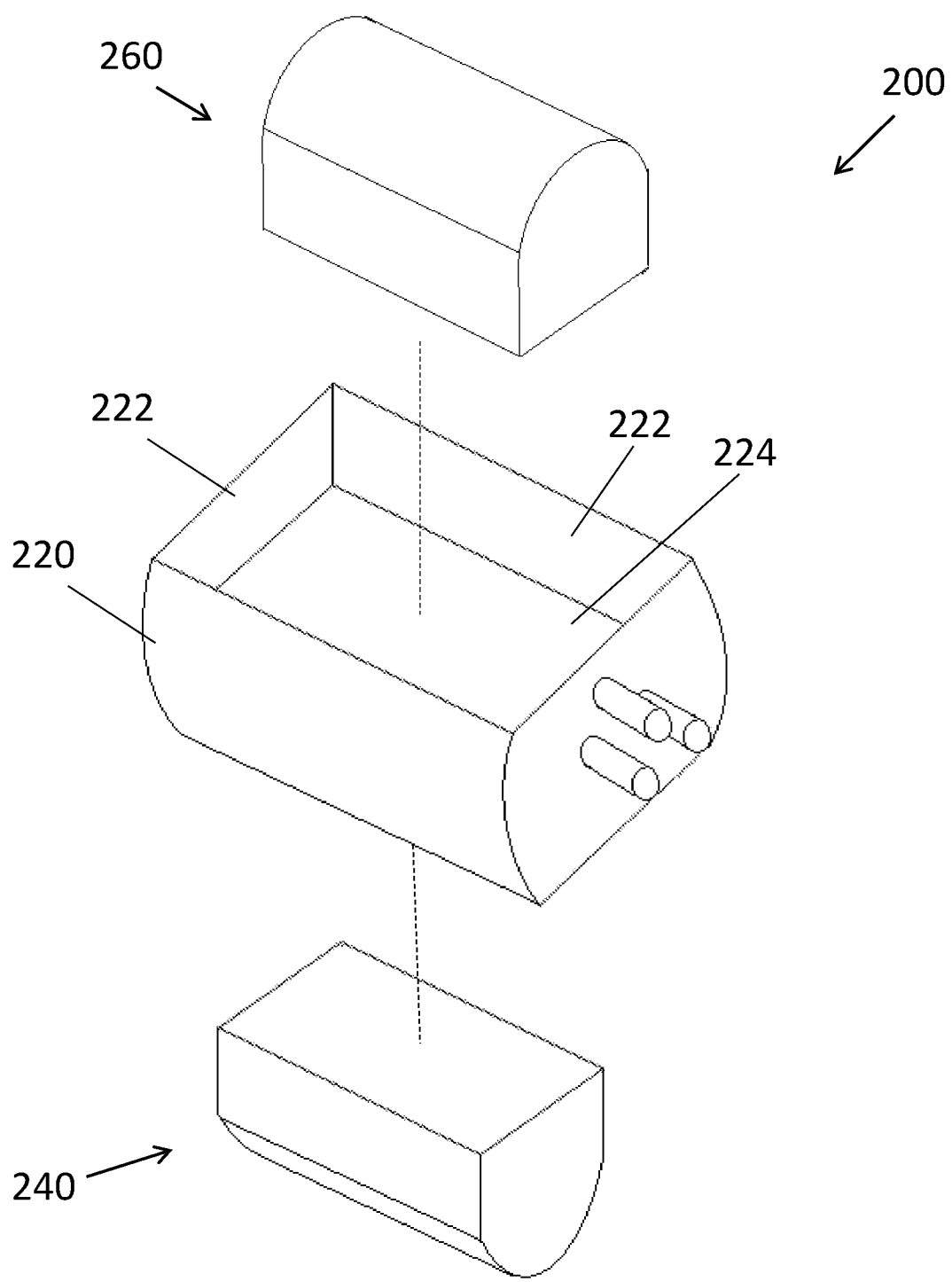
FIG. 11C is an exploded perspective view of the nail polish application mechanism of FIGS. 11A-B.

Referring to FIG. 11C, housing 220 may have any suitable shape to receive the first applicator 240 therein, as well as the second applicator 260 if included in application mechanism 200. In the illustrated embodiment, housing 220 includes a plurality of sidewalls 222 and a base 224 extending between the sidewalls that together form a recess for receiving second applicator 260. Although not labeled and/or shown in FIG. 11C, a similar or identical group of sidewalls and base may form another recess opposite the first recess to receive first applicator 240 therein. Preferably, the recesses in housing 220 have a complementary shape to the portions of the first applicator 240 and/or the second applicator 260 to be received in the recesses. In the illustrated example, each applicator 240, 260 has a substantially rectangular base that is received within the corresponding rectangular recesses of housing 220, and a rounded or pointed tip extending from the rectangular base. As shown in FIGS. 11A-B, when the first applicator 240 and the second applicator 260 are received within the housing 220, at least some portion of the applicators, including the tip, preferably extends beyond the sidewalls 222 of housing 220. The first applicator 240 and second applicator 260 may be secured to housing 220 in any suitable manner, including for example via adhesives and/or an interference fit between the applicators and the housing.

Each applicator 240, 260 may be formed of any suitable material that is capable of absorbing, retaining, and/or dispensing the particular component that the applicator is intended to apply. For example, the first applicator 240 may be used to apply curable nail polish resin, including color, base, and/or top coats as described above. The second applicator 260 may be used to apply a wiping solution, such as an alcohol solution, to remove uncured nail polish resin from a user's nail and/or skin surrounding the user's nail.

First applicator 240, when used to apply a curable nail polish resin, is preferably an open-cell foam that can be soaked, impregnated, or saturated with the curable nail polish resin so that the first applicator 240 absorbs the resin and is able to deposit the resin on a user's nail when the applicator is brought into contact with the user's nail. When the first applicator 240 is an open-cell foam, the particular type of foam material, as well as the cell structure and/or size of the foam, may be tailored to the particular resin being used with the foam. In one example, a polyurethane or similar material may be suitable for many types of nail polish resin. Whatever material is used to form the first applicator 240, it is preferable that the first applicator 240 is capable of absorbing enough nail polish resin for the desired use, and that the shape and the material of the first applicator 240 allows for deposition of the resin to the user's nail with substantially even coverage of the nail. The shape of the first applicator 240 may include a rounded or "V"-shaped tip that is intended to contact the user's nail, with the tip extending across the entire surface of the nail in a direction orthogonal to the direction of the user's finger, so that dragging the applicator 240 along the nail in a direction parallel to the user's finger evenly coats the entire surface of the nail with resin. However, it should be understood that applicator 240 could be moved in any desired direction relative to the user's finger, including toward or away from the direction in which the finger points, transverse that direction, with any desired rotational motion, or any other motion configured to provide the desired deposition from the applicator 240 to the nail. In some uses, described in greater detail below, a single application mechanism is intended for use with a single manicure, which may encompass a total of ten nails, and thus the first applicator 240 preferably contains enough nail polish resin for application to ten nails total, including, for example, one, two, or three coats of nail polish resin per nail. In some embodiments, the first applicator 240 may be configured to retain additional nail polish resin to provide enough resin for additional rounds of application to allow for fixes, for example if a user chips the nail polish shortly after performing the manicure (or pedicure). In addition, first applicator 240 is preferably saturated with the particular nail polish resin intended for use with the first applicator 240 so that minimal or no air remains in the first applicator 240, otherwise compression of the first applicator 240 during deposition of resin to the user's nail could also cause air bubbles to form in or on the deposited resin, which is undesirable.

Second applicator 260, when used to apply a wiping solution such as an alcohol solution, may also be an open-cell foam that can be soaked, impregnated, or saturated with the wiping solution. The particular wiping solution may be any solution that is effective at removing uncured nail polish resin, including, but not limited to, isopropyl alcohol, with or without acetone. Second applicator 260 may have a similar or different shape than first applicator 240, and may be made from similar or different materials. As with first applicator 240, second applicator 260 should be formed from a material that is capable of absorbing and depositing the particular wiping solution to be used with the second applicator 260. Because second applicator 260 is intended for use in wiping the user's nail and surrounding skin after resin has been cured onto the nail, it is preferable that the second applicator 260 is formed from a soft material that will not cause scratches or other damage to the cured resin on the user's nail. It should be understood that applicator 260 could be moved in any desired direction relative to the user's finger to provide the desired wiping or cleaning action, including toward or away from the direction in which the finger points, transverse that direction, with any desired rotational motion, or any other motion configured to provide the desired deposition/wiping from the applicator 260 to the nail. Still further, it should be understood that the wiping solution may be specific to the type of resin being used. For example, if the resin is water soluble or partially water soluble, the wiping solution may be water or water-based. If the resin is alcohol soluble or partially alcohol soluble, the wiping solution may be alcohol or alcohol-based.

It should be understood that, although a housing with two applicators is illustrated and described, the same or a different housing may be used with a single applicator that includes curable nail polish resin impregnated therein for application to a user's nail, without any corresponding second applicator. In such an embodiment, the steps of wiping away uncured nail polish with an alcohol solution described below may be completely omitted, or otherwise performed manually. Similarly, although the housing is illustrated and described as including two applicators at opposite sides of the housing, this is not necessary. For example, in some embodiments, two (or more) applicators could be on the same side of a housing, or otherwise positioned on different sides of the housing that are not necessarily opposite one another. When two applicators are used, including one that functions to apply curable nail polish resin to a user's nail, and one that functions to wipe away uncured nail polish resin from the user's nail and/or surrounding skin, the two applicators should be positioned and/or spaced apart relative to one another so that one applicator does not interfere with use of the other applicator. In other words, both applicators could be positioned on the same side of a housing and spaced apart from one another, so that the first applicator applies the nail polish resin, and the second applicator wipes away uncured nail polish resin, with a space in between the two applicators to allow for UV light or other curing energy to cure the resin deposited by the first applicator before the second applicator contacts the portion of the user's nail which the first applicator has already contacted. In other words, the first and second applicator, if a second applicator is included, may have any positioning relative to one another that allows for performance of the main functions of depositing nail polish resin, curing the resin on the nail, and wiping away uncured nail polish. Although embodiments with one or two applicators are described above, it should be understood that any number of applicators may be used, for example including a system having one applicator for a base coat, one applicator for a color coat, one applicator for a top coat, and another applicator for a wiping solution. Similarly, applicators for other components (e.g. additional color coats) may also be suitable for use in a single housing or within a single application mechanism.

Figure 12A:
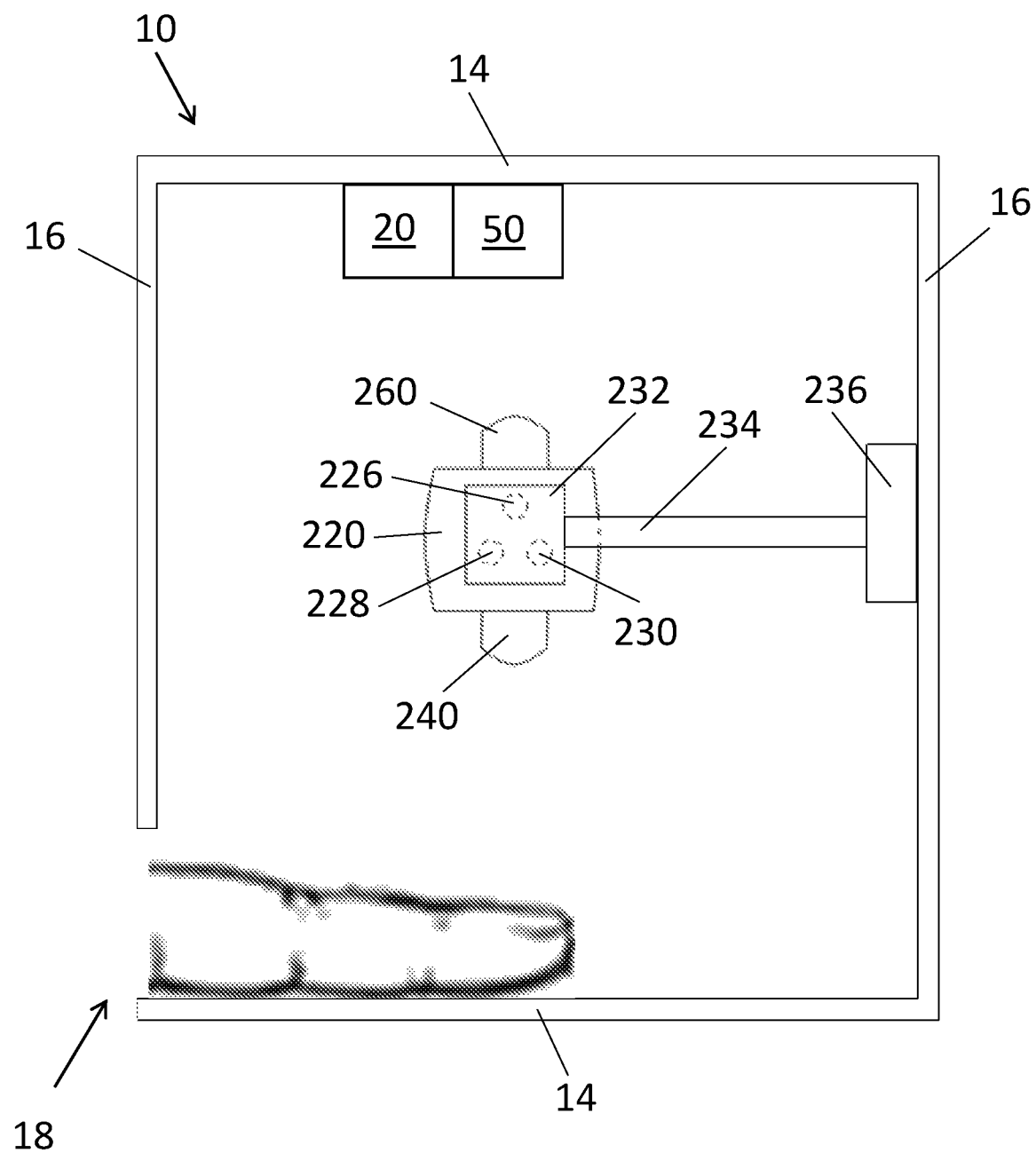
FIGS. 12A-G illustrate various steps of a method of using the nail polish application mechanism of FIGS. 11A-C.

FIGS. 12A-G illustrate an exemplary use of the application mechanism 200 in a system similar to that described in connection with FIGS. 1-2. FIG. 12A illustrates a first step in a manicure (or pedicure) method in which application mechanism 200, with first applicator 240 already having already been soaked with the desired curable nail polish resin, and the second applicator 260 having already been soaked with the desired wiping solution. The user may attach the application mechanism 200 to a receiving mechanism within housing 10. In the illustrated example, the application mechanism includes a mating structure attached to housing 220, which is shown as three cylindrical protrusions 226, 228, 230 extending from a side of the housing 220 and being arranged in a triangular pattern. In FIG. 12A, the receiving mechanism may include a mating member 232 having a corresponding mating structure, such as three cylindrical recesses that each receive a corresponding cylindrical protrusion 226, 228, 230. Mating member 232 may be coupled to an elongate arm 234 that is attached to movable member 236, which in turn is operatively coupled to housing 10.

Figure 12B:
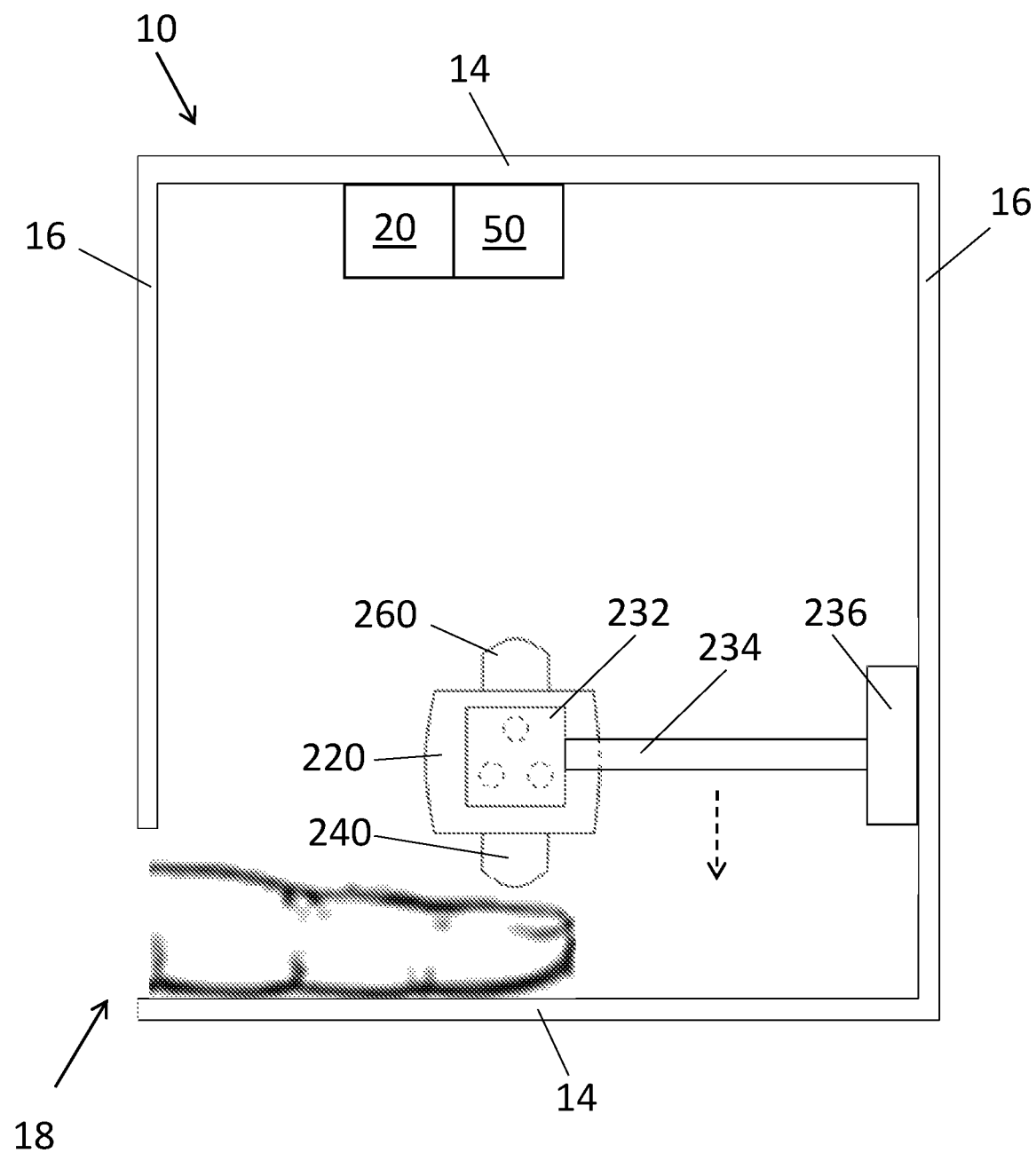
Figure 12C:
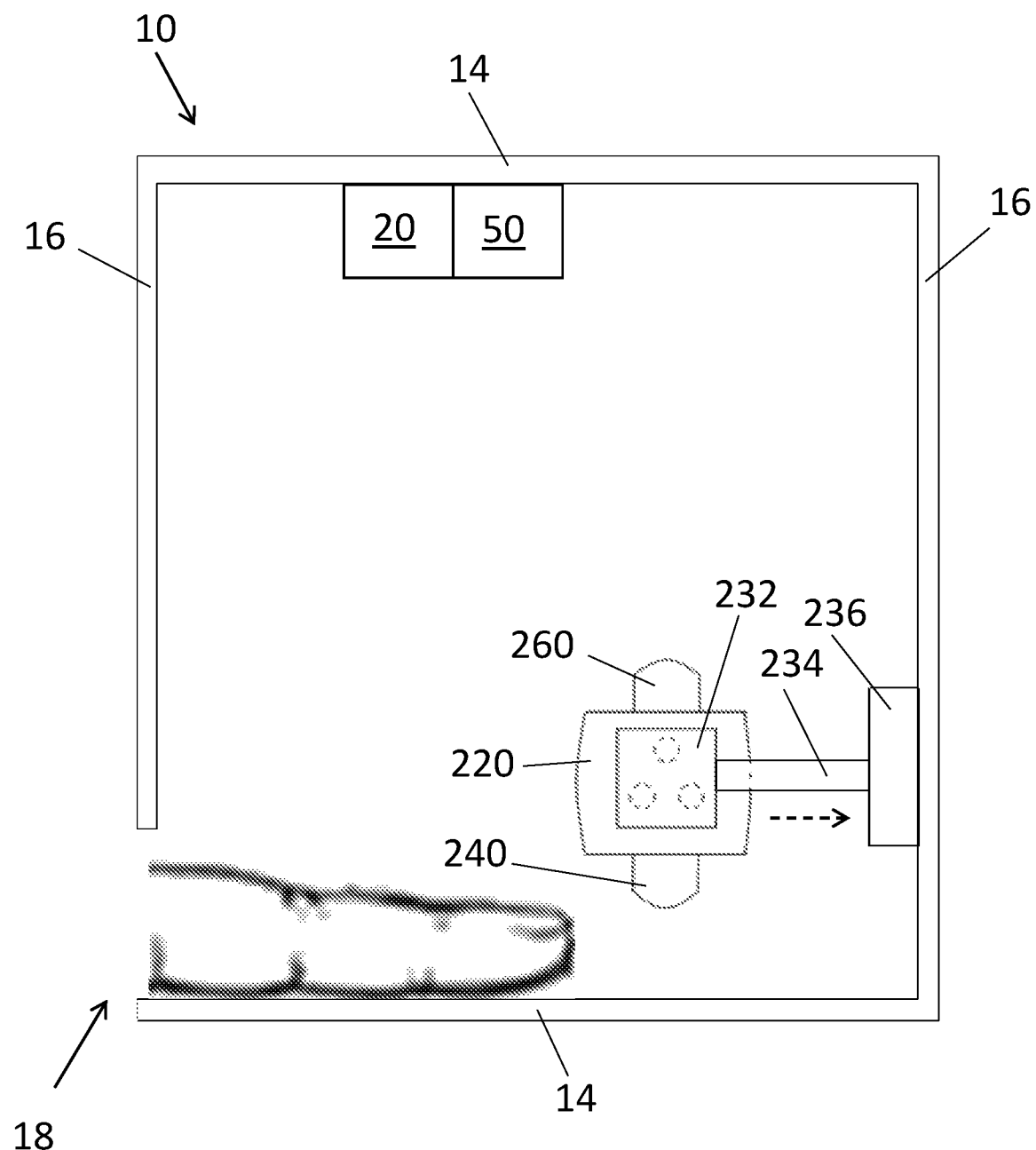

When the application mechanism 200 is coupled to mating member 232, once the manicure process is initiated, the movable member 236 may move in a direction toward the user's nail to bring the tip of the first applicator 240 into contact with the user's nail, preferably at or near the proximal end of the user's nail, as shown in FIG. 12B. After contacting the user's nail, the movable member 236 may retract to drag the tip of the first applicator 240 across the user's nail in order to deposit an even coat of curable nail polish resin on the user's nail, as shown in FIG. 12C. With the first coat of polish having been applied to the user's nail as shown in FIGS. 12A-C, the UV source 50 may activate to cure the resin on the user's nail, preferably with the assistance of the camera 20 and/or another mechanism used to detect the edges and/or contours of the user's nail. It should be understood that camera 20 and UV source 50 may take the form of any of the embodiments described above, including for example two high speed mirror galvanometers that direct UV energy (although it should be understood that other energy may be appropriate depending on the particular type of curable resin) only to areas of the user's nail as detected by the camera 20 (although it should be understood that the camera may take any suitable form and may be operatively coupled to any suitable edge detection and/or anatomical or shape recognition hardware/software). It should be understood that the deposition of the resin described in connection with FIGS. 12A-C may be likely to deposit resin on the user's skin in addition to the user's nail, but that resin remains uncured after the first curing step because of the precision of the UV source 50.

Figure 12D:
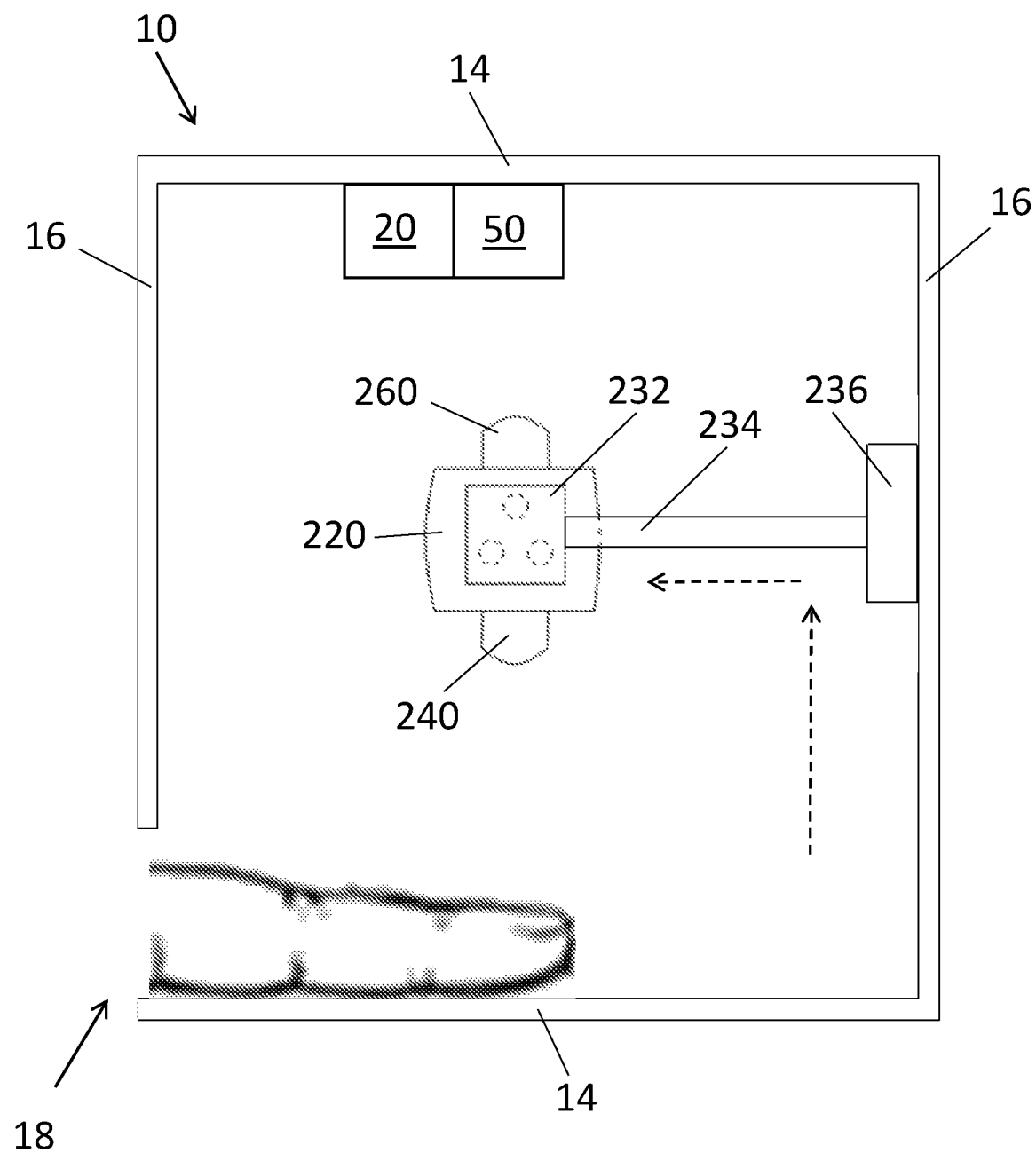
Figure 12E:
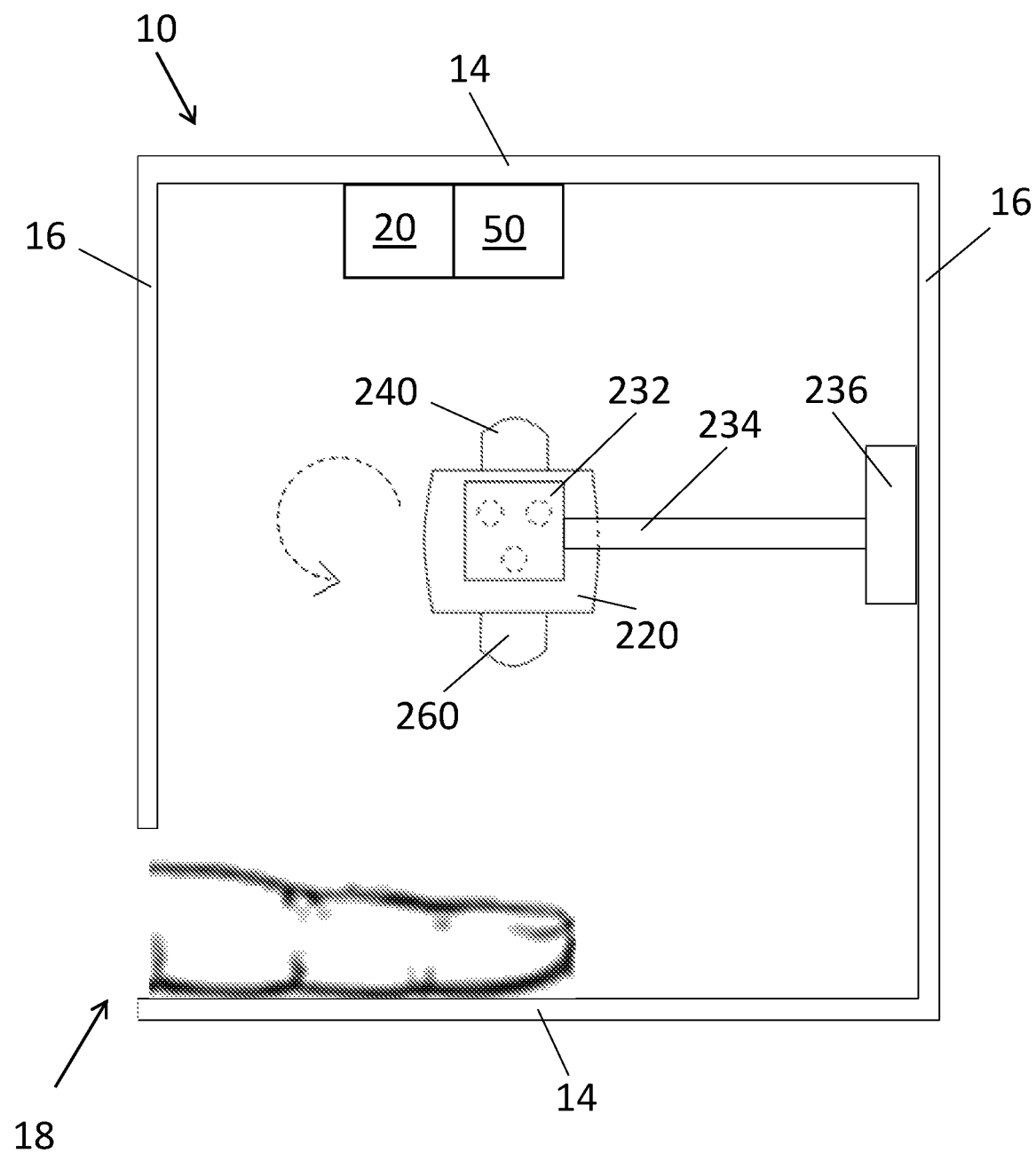
Figure 12F:
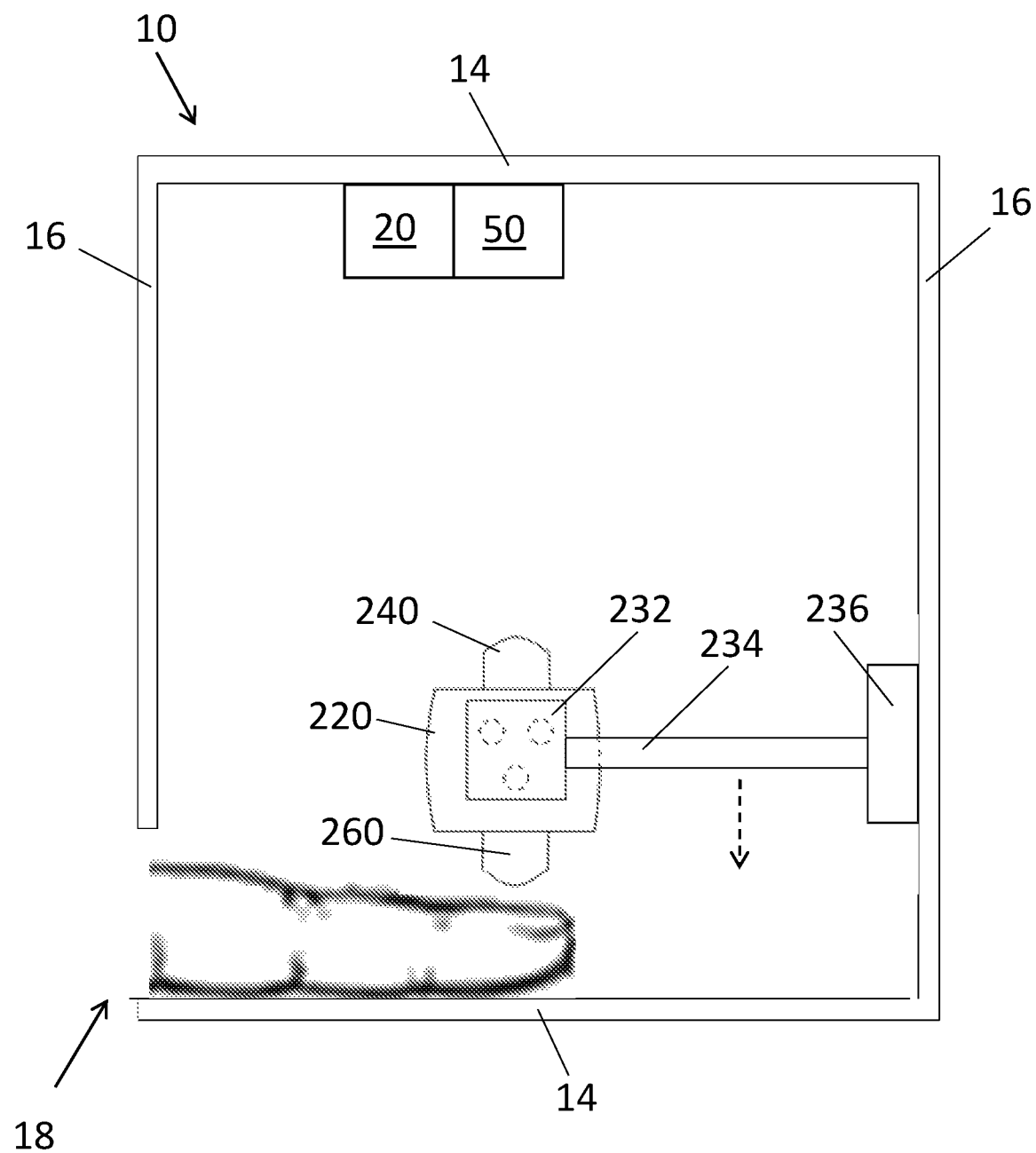
Figure 12G:
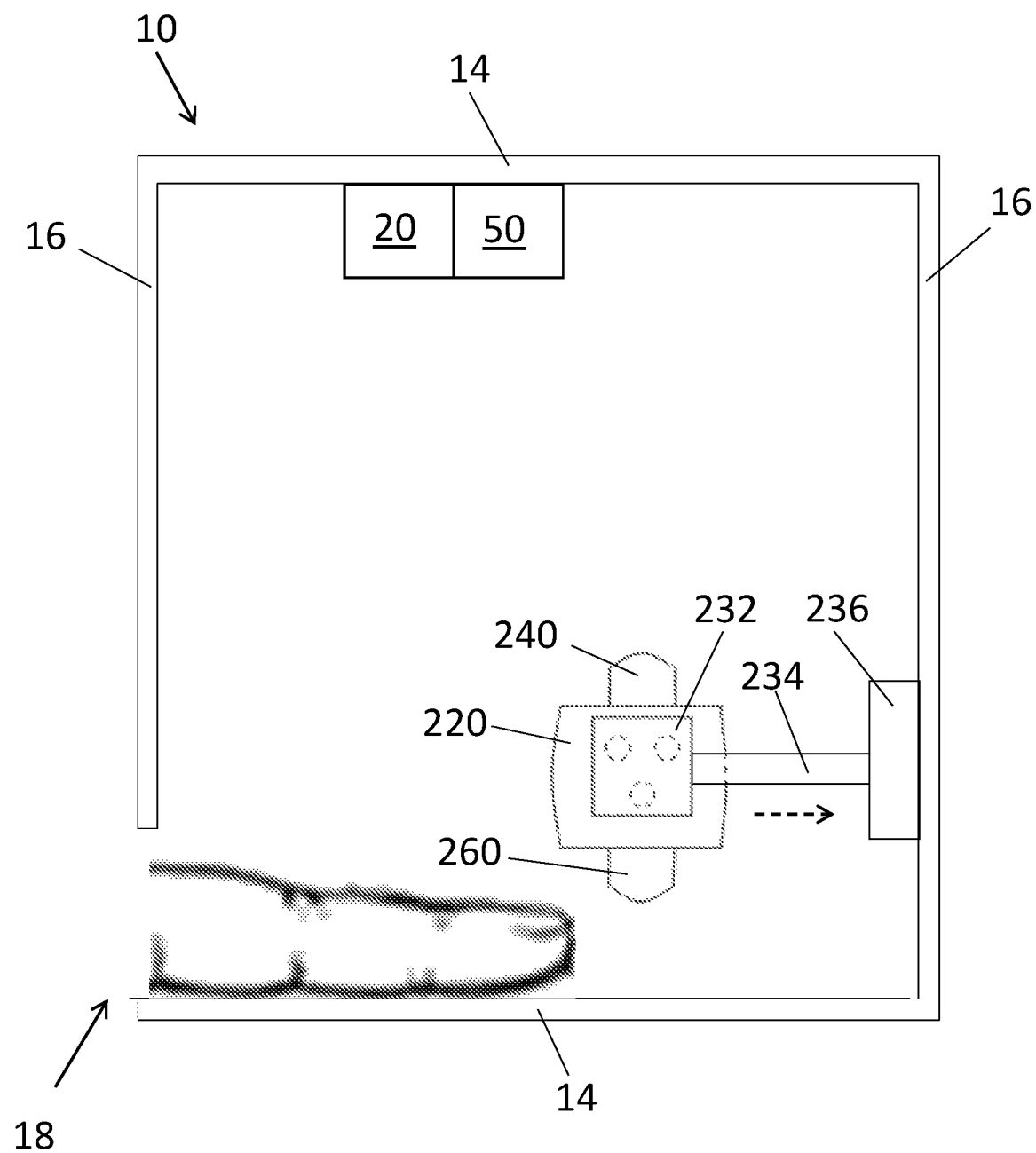

FIG. 12D illustrates the application mechanism 200 having been brought back to a position above the user's nail, for example via the movable member 236 moving up and extending the application mechanism 200 toward the user's nail, which may be completed in one or more steps. With the position of the application mechanism 200 being substantially reset, the mating member 232 may rotate, for example about 180 degrees, to cause a corresponding rotation in the application mechanism 200, as shown in FIG. 12E. The rotation of application mechanism 200 may be achieved with any suitable rotational connection between arm 234 and mating member 232, including motor-driven rotational connections. Once the rotation is complete, as shown in FIG. 12E, the second applicator 260 is positioned facing the nail, and the process described above can be repeated. For example, the tip of second applicator 260 may be brought downward toward the user's nail, as shown in FIG. 12F, then the second applicator 260 retract to drag the second applicator 260 across the user's nail and adjacent skin to wipe away any uncured resin that remains on the user's nail and/or skin, as shown in FIG. 12G. Then, the application mechanism 200 may be brought back to the position shown in FIG. 12E. If additional coats of resin are to be applied, the application mechanism 200 may rotate again to move the first applicator 240 to face the user's nail, and the entire process of resin application and wiping away of uncured resin can be repeated for each additional desired coat. By partially or fully automating the deposition of nail polish resin, curing of that resin with high precision, and removing uncured resin remaining on the user's skin adjacent the nail, three coats of nail polish resin may be cured onto a user's nail (including up to three corresponding cycles of cleaning the user's skin with the wiping solution), in as little as a minute or less.

It should be understood that linear movements of application mechanism 200 may be provided by any desired system, and in some embodiments, as described in greater detail below, linear movements may omitted entirely. For example, the moveable member 236 and/or arm 234 may be part of a two-axis motor driven gantry that provides for movement in the left-right and up-down direction of FIGS. 12A-G. A third axis of movement in the "Z" axis into and out of the page of FIGS. 12A-G may be provided as well, although it may be unnecessary, particularly if the first and second applicators 240, 260 are wide enough to extend the entire width of the user's nail(s). It should also be understood that movable member 236 may be movable along a single linear axis, with arm 234 being having a telescopic motion feature which provides for the left-right movement of the applicator system 200 in the view of FIGS. 12A-G. Still further, the active motor-driven rotation of application mechanism 200 may be removed in some embodiments. For example, if movable member 236 is capable of moving along two linear axes, a pin or other structure may be placed at a desired location within housing 10, so that, when it is time to rotate application mechanism 200, the movable member 236 may position application mechanism 200 adjacent that pin, and by pushing (or pulling) the application mechanism 200 against that pin, cause rotation of the application mechanism via contact with the pin, removing the necessity for a separate motor-driven rotation of application mechanism 200. It should be understood that, in embodiments in which application mechanism 200 is rotatable, mating member 232 may also be rotatable with respect to arm 234.

It should also be understood that, although the application system 200 is described as having three cylindrical protrusions arranged in a triangular shape that mate with three corresponding recesses in mating member 232, this is merely one example and other mating structures may be sufficient. For example, the housing 220 of application system 200 may instead include three cylindrical recesses in a triangular shape, with mating member 232 including three corresponding cylindrical protrusions in a corresponding triangular shape. More broadly, members other than cylindrical protrusions and corresponding cylindrical recesses, as well as members being positioned in configurations other than triangular configurations, may be equally suitable for use in allowing coupling of application mechanism 200 to mating member 232. Preferably, any connection mechanism used to couple application mechanism 200 to mating member 232 allows for rotational movement of mating member 232 to be translated to application mechanism 200 to allow for switching between the first applicator 240 and the second applicator 260 facing the user's nail.

It should be understood that any of the linear movements of application mechanism 200 shown in FIGS. 12A-G may be based on fixed, pre-programmed movements, or may be based on detected positions of the user's nail. For example, edge detection, shape recognition, and/or other software, including any examples described above, may help determine the position of the user's nail in space with respect to the housing 10 and/or the application mechanism 200. This information may be utilized when directing movement of the movable member 236 and/or other moving components to position the first applicator 240 and/or second applicator 260 in desired positions relative to the user's nail and/or surrounding skin. In other examples, the movements shown in FIG. 12A-G may be pre-programmed so that movable member 236 moves through a particular range of motion in a particular sequence, with the assumption that the user will place his or her nail in the indicated position to allow for accurate deposition of resin and wiping of uncured resin by application mechanism 200. In still other embodiments, the movements may be based on user input. For example, movable system 236 may move application system 200 through a fixed sequence of movements, with the particular sequence being based on which finger the user indicates is the housing 10, since a fixed sequence of movements for a user's thumbnail may not be appropriate for use on the same user's middle fingernail.

Figure 13:
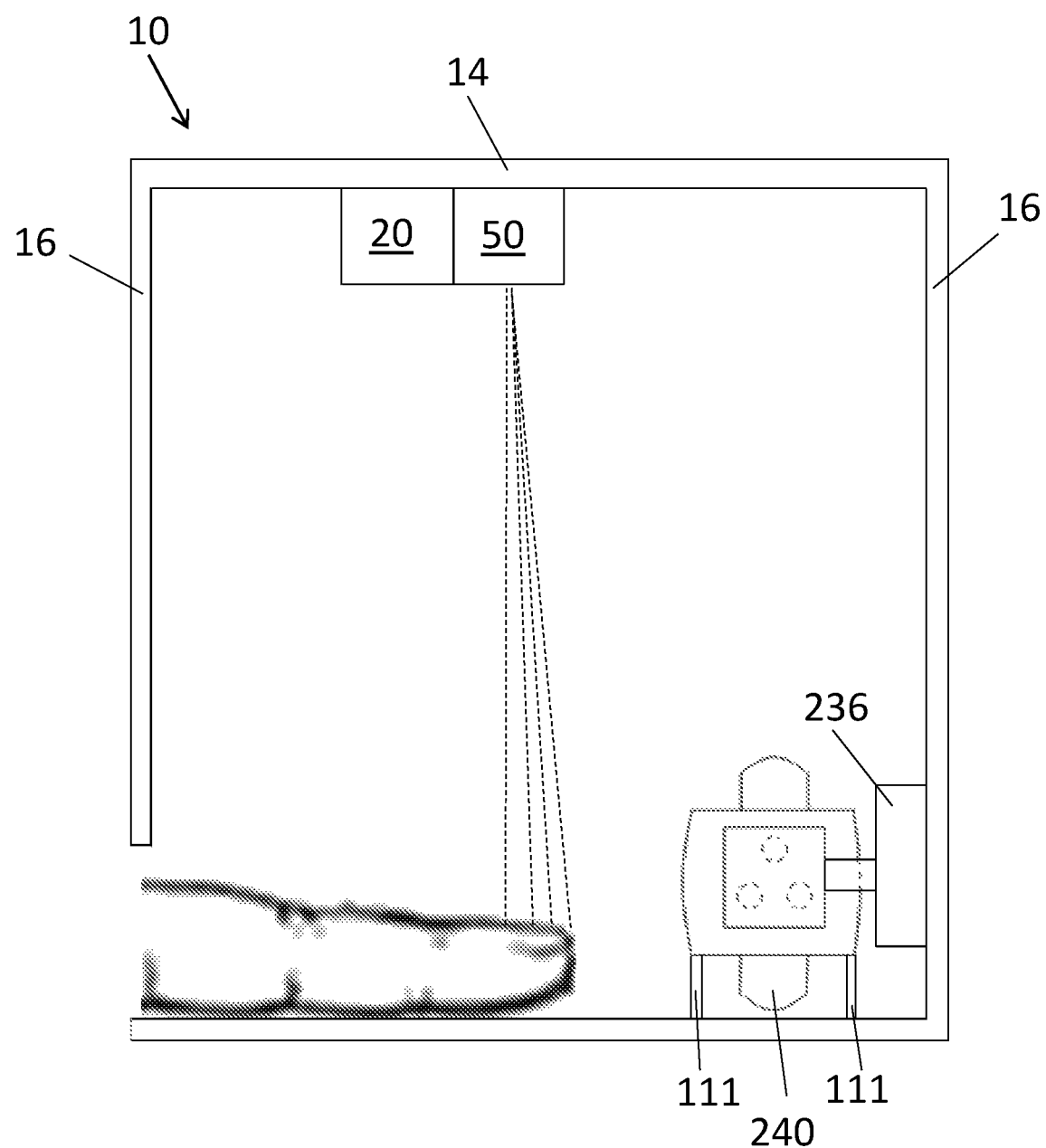
FIG. 13 illustrates an enclosure for use with the nail polish application mechanism of FIGS. 11A-C.

Referring still to FIGS. 12A-G, it should be understood that there is a possibility that, when UV source 50 is directing UV energy toward the user's nail to cure the resin deposited by application mechanism 200, resin stored within first applicator 240 may be cured to some degree, for example if UV energy scatters or reflects off of a surface toward the first applicator 240. Although this risk may be small, particularly with a highly precise UV source 50, the risk may be further mitigated by various methods. In one example, shown in FIG. 13, the movable member 236 may cause the application mechanism 200 to be positioned in contact with an additional enclosure 111, so that the first applicator 240 is blocked from being exposed to energy originating from UV source 50 while the UV source is active. Enclosure 111 is illustrated as a plurality of walls that, together with a bottom wall 14 of housing 10 and the housing 220 of application mechanism 200, form a sealed or substantially sealed volume in which the first applicator 240 resides. The first applicator 240 may be positioned within the enclosure for the duration of any application of energy from UV source 50, with the first applicator being physically blocked to exposure to that energy from enclosure 111, the housing 220 of application mechanism 200, and/or the bottom wall 14 of housing 10. Although enclosure 111 is shown in one specific location within housing 10, it should be understood that the enclosure may have any desired shape and be in any desired position, as long as it serves to eliminate or minimize the possibility of UV energy being directed to first applicator 240 while the UV source 50 is active. Other mechanisms that provide the same or a similar result via different structures may also be used instead of an enclosure 111. For example, a cap or other structure may be provided on housing 220 of application mechanism 200 that shields first applicator 240 from UV energy when the cap is in a closed condition, and exposes the first applicator 240 for deposition of resin onto the user's nail when the cap is in an open condition, the cap being transitionable between the open and closed condition depending on the particular stage of the manicure process.

Figure 14A:
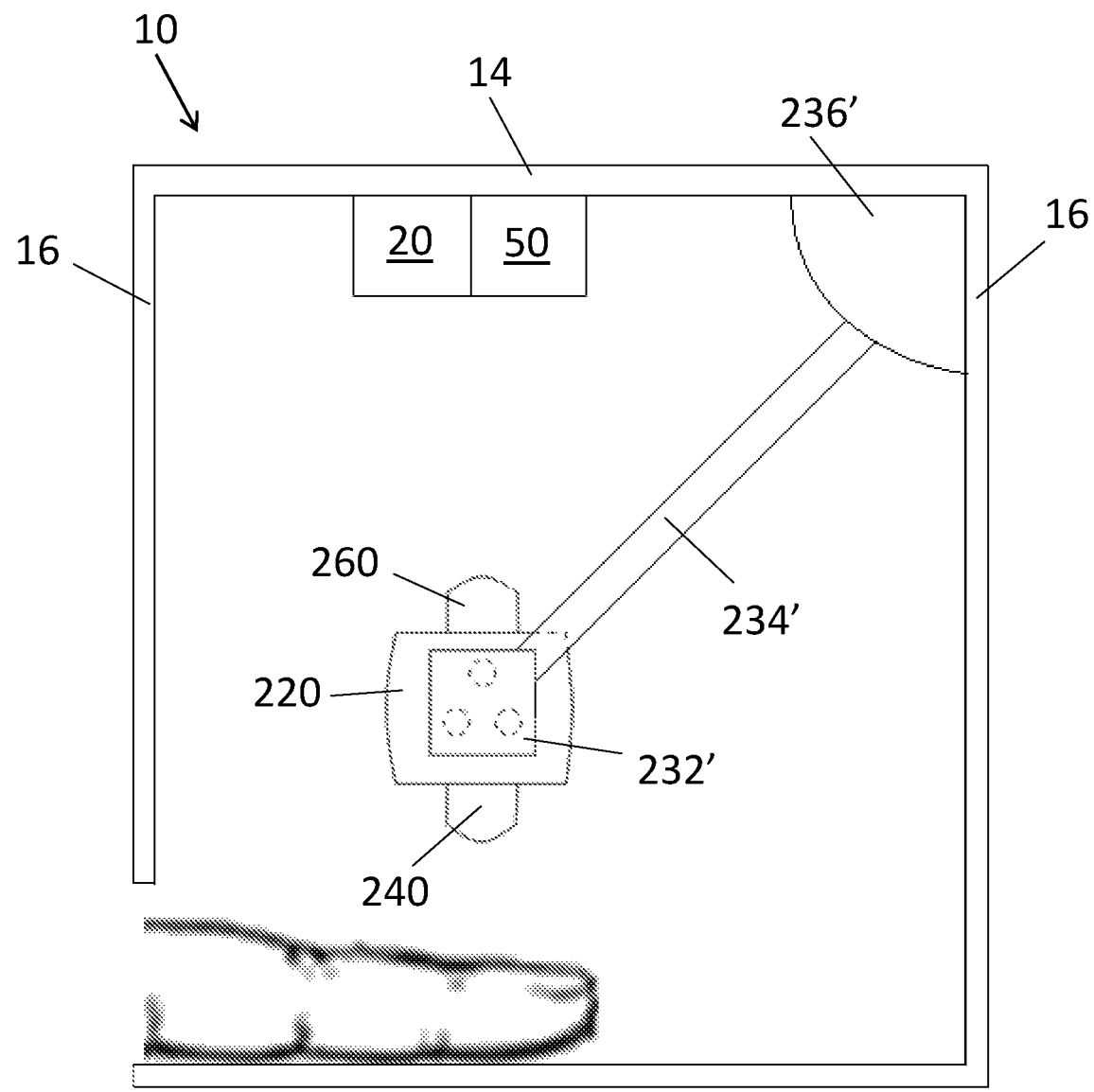
FIGS. 14A-D illustrate various steps of another method of using the nail polish application mechanism of FIGS. 11A-C.
Figure 14B:
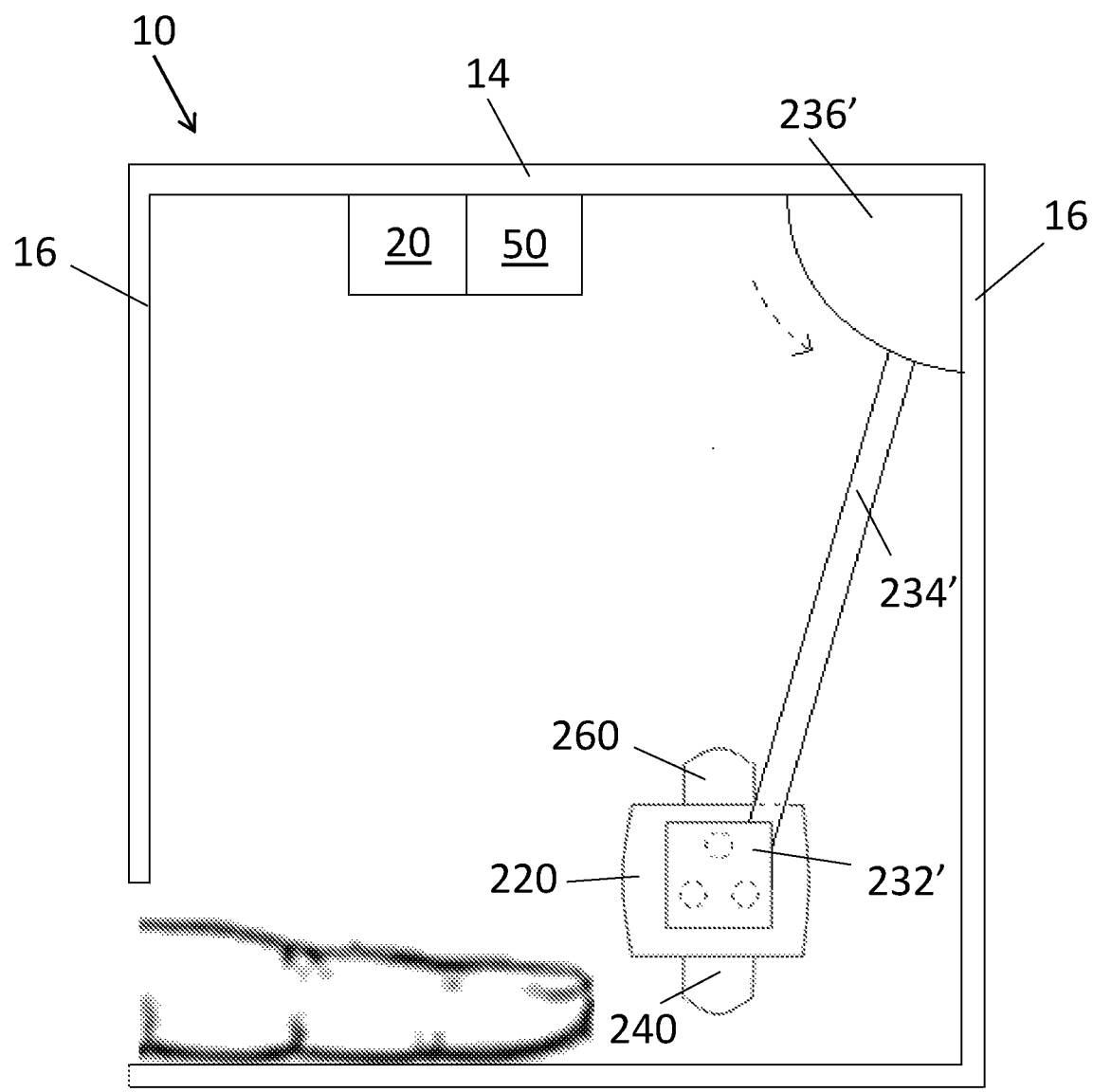
Figure 14C:
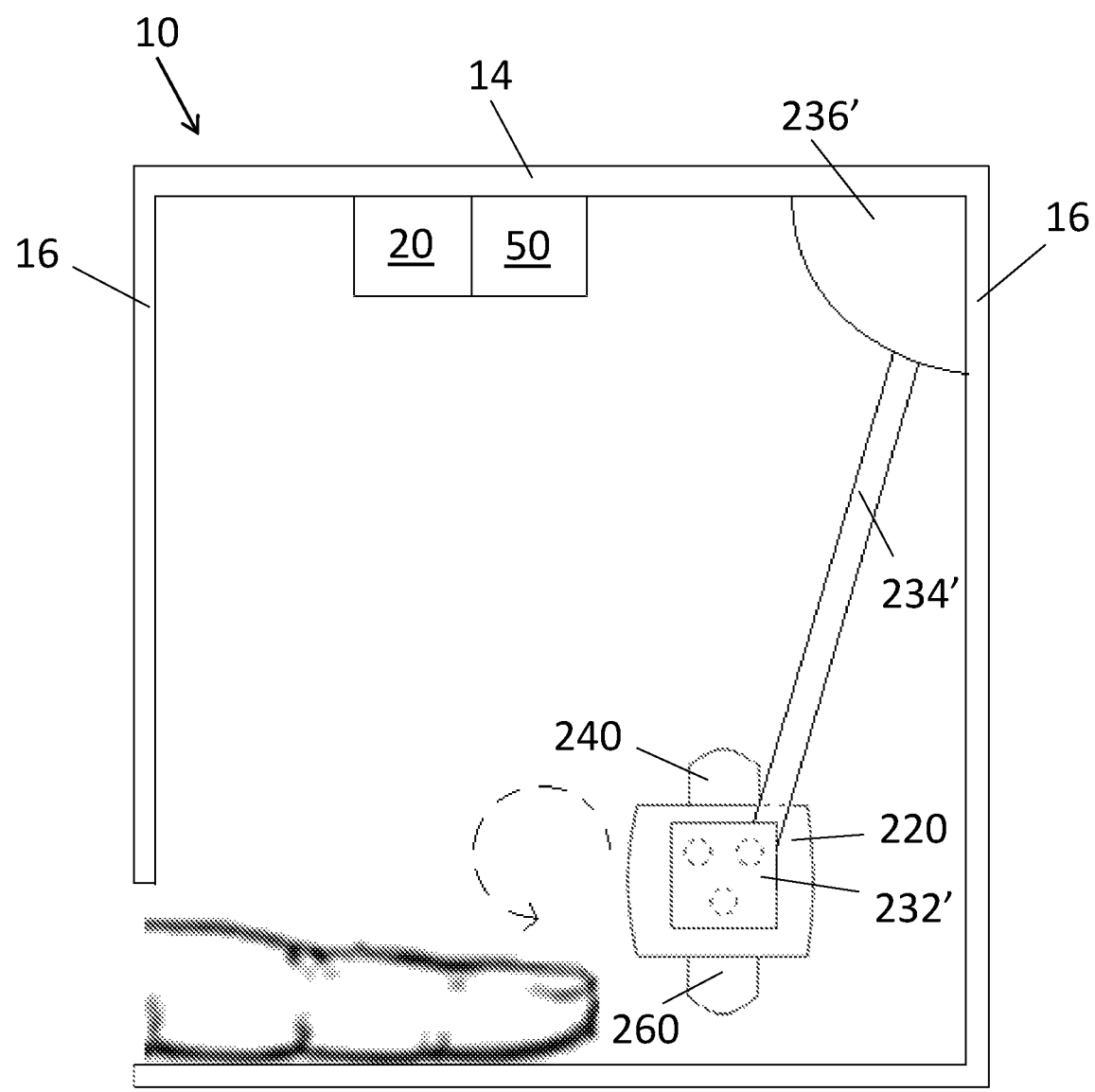
Figure 14D:
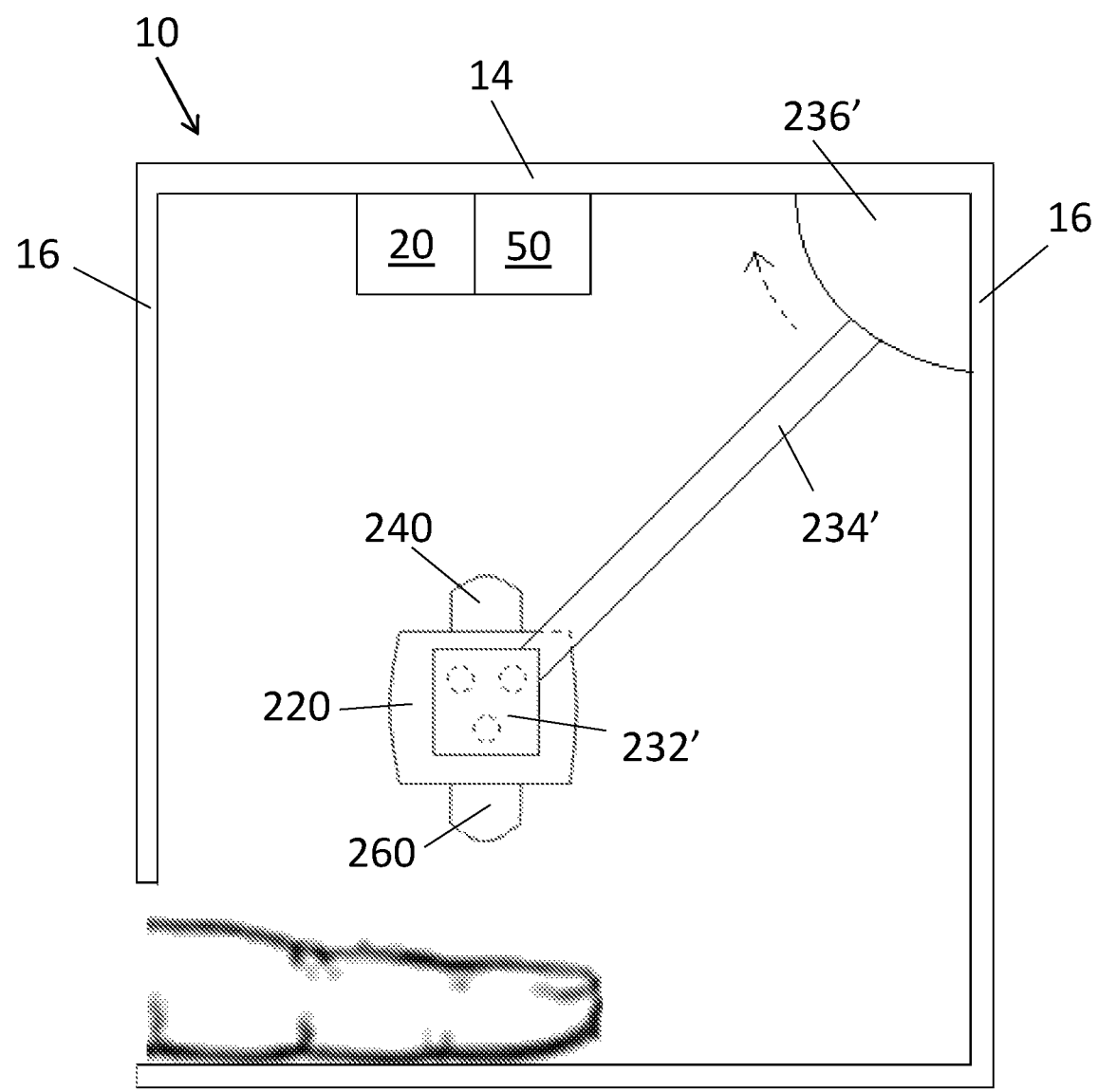

Application mechanism 200 is described in connection with FIGS. 12A-G as being connectable to a motor system that includes one or two linear degrees of freedom and a single rotational degree to allow for switching between using the first applicator 240 and the second applicator 260. However, it may be desirable to reduce or eliminate linear movement of application mechanism 200, since rotational movement is often simpler from a manufacturing and/or use standpoint. FIGS. 14A-D illustrate application mechanism 200 being used in a system that includes only two points of rotation. Application mechanism 200 may be coupled to a mating member 232' that is substantially identical to mating member 232, and which is coupled to a base 236' via an arm 234'. The proximal end of arm 234' may be rotatably coupled to base 236'. Nail polish resin may be deposited onto the user's nail by rotating arm member 234', which causes first applicator 240 to drag across the user's nail to deposit the resin as the application mechanism 200 transitions between the positions shown in FIG. 14A and in FIG. 14B. After deposition of the resin, the resin may be cured as described in connection with other systems above, and during that curing stage the first applicator 240 may be shielded from energy emanating from UV source 50 with methods similar to those described above. After curing, the application mechanism 200 may rotate 180 degrees, as shown in FIG. 14C, in substantially the same manner as described above in connection with FIG. 12E. Then, the arm 234' may rotate back to its initial position, causing the second applicator 260 soaked in the wiping solution to wipe uncured resin from the user's nail as it transitions from the position shown in FIG. 14C to the position shown in FIG. 14D. This process may be repeated for additional application of coats of resin and wiping solution as described above. Although the system shown in FIGS. 14A-D provides for a first point of rotation between the proximal end of arm 234' and the base 236', and a second point of rotation between the distal end of arm 234' and mating member 232', it should be understood that other particular configurations may similarly allow for application of the resin via first applicator 240 and wiping uncured resin via the wiping solution in second applicator 260 with only rotational movement of application mechanism 200.

Still referring to FIGS. 14A-D, it may be preferable that both the resin application step and the wiping step are completed by dragging the corresponding applicator in the same general direction from the base of the user's nail toward the tip of the user's nail. A system like that shown in FIGS. 14A-D could provide for such a process, for example by causing application mechanism 200 to rotate about 90 degrees in the step illustrated in FIG. 14C, then returning application mechanism 200 to a position above the base of the user's nail and rotating the application mechanism 200 another 90 degrees so that the second applicator 260 faces the user's nail. The application mechanism 200 could then be dragged along the user's nail toward the tip in substantially the same manner shown in FIGS. 14A-B. This type of configuration would allow for both applicators to drag along the user's nail in the same type of direction. The 90 degree rotation of application mechanism 200 after an application or wiping step may be performed so that, when the application mechanism 200 returns to an initial position in preparation for the next deposition, the applicators 240, 260 are clear of the user's nail.

Figure 15:
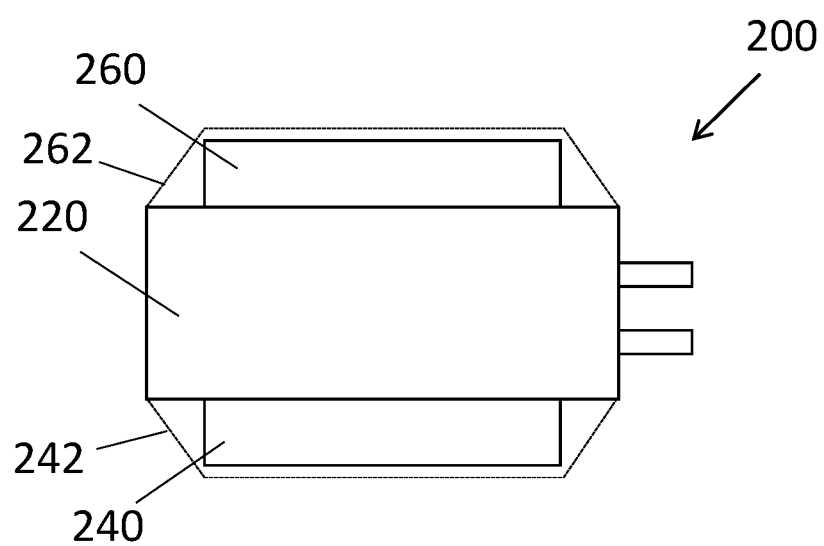
FIG. 15 illustrates sealing members that may be used to seal portions of the nail polish application mechanism of FIGS. 11A-C.

As noted above, because first applicator 240 dispenses a curable resin and second applicator dispenses a wiping solution, the first and second applicators may have a limited use before needing to be refilled or replaced. Referring back to FIG. 11C, in some embodiments, the first applicator 240 and/or second applicator 260 may be removable from housing 220 so that they may be removed from the housing 220 once the resin and/or wiping solution is partially or fully dispensed, and replaced with a fresh replacement applicator for continued use. However, this type of replacement may be practically difficult, as resin and/or wiping solution may have transferred to portions of housing 220 and because the process may be generally messy, among other reasons. Thus, it is generally preferable that application mechanism 200, including the first and/or second applicators 240, 260, be provided as a separate, disposable element. For example, application mechanism 200 may be provided to an end user in a pre-packaged form with a particular nail polish resin already soaked into first applicator 240, and a wiping solution already soaked into second applicator 260. This may allow for a variety of different types and colors of nail polish resins to be provided in pre-packaged form, and even particular wiping solutions that are more effective at wiping whatever corresponding resin is provided on the first applicator 240. Because the first and second applicators 240, 260 may tend to dry over time, it is desirable to seal first applicator 240 and the second applicator 260 with the housing 220 so that a pre-packaged application mechanism 200 can be opened just prior to the time of use, ensuring that the materials soaked into the applicators do not dry out or otherwise suffer from prolonged exposure to ambient conditions. For example, as shown in FIG. 15, a sealing member 242 may be coupled to housing 220 so that first applicator 240 is completely sealed between the sealing member 242 and the housing 220. Similarly, a sealing member 262 may be coupled to housing 220 so that second applicator 260 is completely sealed between the sealing member 262 and the housing 220. The sealing members 242, 262 may take any suitable form, for example foil or metal sheets that are welded or otherwise attached to housing, for example via induction sealing. However, it should be understood that other types of seals, including plastic seals, or plastic caps, may be similarly suitable. While FIG. 15 illustrates seals 242, 262 in broken line, it should be understood that the seals are preferably impermeable or substantially impermeable to air so that the applicators do not dry out during storage. Preferably, if the material which the applicator holds is curable by a particular type of energy, such as UV light, the seal for that applicator also partially, substantially, or completely blocks the relevant type of energy from passing through to the applicator. For example, if first applicator 240 includes UV-curable nail polish resin, seal 242 preferably limits UV light from passing through the seal and striking the resin on the applicator to completely or substantially completely prevent the resin from prematurely curing. While two seals are generally shown, it should be understood that a seal may be provided for each applicator in a particular application mechanism, as desired. Further, it should be understood that whatever type of energy (e.g. electromagnetic energy of a particular type or spectrum) is adapted to cure the particular type of resin being used, the relevant seals preferably are configured to block (entirely or substantially entire) that type of energy from passing through the seal.

In some embodiments, seals 242 and/or 262 may be manually removed prior to use of the application mechanism 200. For example, one or both seals could be removed by the user prior to connecting application mechanism 200 to the system that will assist in applying and curing the nail polish. However, in other embodiments it may be preferable to partially or fully automate the removal of one or both seals 242, 262 by the nail polish application and curing system. For example, it may be preferable to configure seals 242 and/or 262 and housing 220 so that, upon connection of the mating mechanism of the housing to the corresponding mating member of the housing 10, one or both seals or punctured, broken, or otherwise modified so that the applicators become at least partially exposed and able to perform their functions of applying resin and/or alcohol wiping solution. For example, the seals or the housing of the application mechanism may include sliders that are forced to slide along the length of the seals as the application mechanism is coupled to the corresponding mating structure in the housing, causes the seals to tear or otherwise disconnect from the housing as the sliders move along the seals. Other devices may be provided, such as blades or other mechanism that can cut the seal and roll the seal to remove the seal, or that can skewer or scrape the seal away from the application mechanism. Still in other embodiments, a plastic or similar shell may be provided around the applicators, with the plastic shell being broken upon connection to the mating structure of the housing. For example, such a housing may be perforated or otherwise structured to be readily forced open, for example in a clam-shell type action, upon connection with the mating structure of the housing.

For any of the embodiments described above that incorporate a curable resin nail polish, it may be desirable to regulate the temperature of the resin during or prior to deposition onto a user's nail. When UV or other curing light or energy contacts the curable resin, the temperature of the resin may affect how the resin cures. For example, when curing energy (e.g. UV light) interacts with a curable resin that has not yet cured, free radicals in the resin may be released to allow monomers within the resin to link or cross-link. If the temperature of the resin is higher, the amount and/or strength of the cross-linking may become correspondingly higher. In practice, curing a curable nail polish resin at a relatively low temperature may result in a cured nail polish with a matte finish or appearance, as opposed to a glossy finish or appearance which may be more desirable. The reason for the matte finish or appearance may be a result of the cross-linking of the resin being relatively low or weak. By curing the resin while the resin is at a higher temperature, the cured nail polish may have a more glossy finish or appearance, which may be a result of better or stronger cross-linking of the resin. Regulating the temperature of the curable resin may be achieved by any one of a number of mechanisms. For example, for any embodiments described above with a nozzle, a heating element may be provided in, on, or near the nozzle in order to heat the resin as it passes through the nozzle. In addition or alternatively, for any embodiments described above in which resin is stored within a cartridge or similar housing prior to deposition onto the user's nail, a heating element may be provided in, on, or near the cartridge or other resin storage component in order to heat the resin prior to deposition onto the user's nail. In addition or alternatively, a heating element may be provided in, on, or near any other component of any of the embodiments described above to provide general radiant heating to the space in which the resin will be prior to curing. For example, a radiant heating element may be provided in housing 10 at any desired location in order to heat the air within the housing, such that the resin may be heated, for example if the resin is stored within a container within the housing, or as the resin is being deposited while it contacts air within the housing that has been heated by the heating element.

A number of different mechanisms for depositing nail polish onto a user's nail have been described above. For example, the use of droplets dropping onto a user's nail, with or without assistance from an electric field, is described above. Similarly, the spraying the resin as a mist or otherwise in fine particles is also described above, for example using an aerosol spray or an electrospray technique. Still further, coating foam or another deposition mechanism with resin, and physically contacting the foam or other mechanism to a user's nail to deposit the resin has been described above. However, it should be understood that other deposition mechanisms may be suitable for use with the curing concepts described above. For example, uncured resin may be provided in a container in which the user may simply dip her fingernail into to ensure coverage of the entire nail, with the covered nail inserted into a system that selectively cures the resin deposited on the nail, without curing resin deposited outside the nail, using any of the suitable curing mechanisms described above. Although this technique may be relatively messy compared to other more precise techniques, the precision of the curing will allow the user to easily wipe away any of the uncured resin after the resin covering the nail is cured. Still further, other mechanisms may be used to apply uncured resin to the user's nail. For example, uncured resin may be stored in bottle or other storage mechanism that could be squeezed or otherwise actuated to deposit uncured nail polish to the user's nail. Such a bottle may be similar to a typical shampoo bottle, which may result in a less precision of deposition than some of the other mechanisms described above, but as also described above, the precision of the curing process may allow for any uncured resin to be readily cleaned from the user's skin following curing of the resin deposited on the user's nail. The deposition mechanisms described in this paragraph may be generally messy or imprecise relative to other embodiments described herein, but these mechanisms may be relatively simple and effective in ensuring that the user's nail is fully covered by resin prior to the curing stage. It should be understood that the deposition mechanisms described in this paragraph may be used with any suitable curing system described herein.

In some embodiments described above, an applicator device includes uncured resin stored therein, with the resin being applied to the user's nail via movement of the applicator so that the applicator contacts the user's nail to deposit the resin onto the nail. For example, FIGS. 12A-G and FIGS. 14A-D illustrate an applicator being moved through a range of motion to cover a nail with uncured resin. In other embodiments, a similar applicator may be provided that stores resin or is otherwise coated in resin, but the applicator may be stationary. In those embodiments, the user may move her nail into contact with the applicator in order to coat the nail with the uncured resin, while the applicator remains stationary.

In the embodiments described above, the uncured nail polish resin is typically stored in a liquid form prior to deposition onto the user's nail. However, in some circumstances, for example depending on the viscosity of the uncured resin, after deposition of the resin onto the user's nail but prior to curing, the thickness of the resin on the user's nail may be somewhat inconsistent, which may be undesirable. One way to address the issue of potentially inconsistent thickness of the deposited resin is to deposit the resin in a form other than from a bulk liquid container. In one example, instead of using a consumable applicator such as that shown in and described in connection with FIGS. 11A-15, a strip of material containing the resin may be applied to the user's nail prior to curing. This process may be a process that is conceptually similar to foil stamping. In foil stamping, a strip or sheet of foil is typically provided with a heat activated glue on one side of the strip, with the opposite side of the foil having the desired aesthetic characteristics. The strip is applied to a surface, with certain areas of the surfaces heated to bind the glue. The strip may be removed from the surface, with the previously-heated sections remaining bound to the surface and the remaining surfaces ripping or otherwise being removed from the surface, with the result being that the previously-heated areas of the surface will retain the strip to present the desired characteristics of the foil. For the purposes of applying uncured nail resin, a conceptually similar mechanism may be used in which a strip is provided with one side of the strip having uncured resin thereon. The strip may be applied to the finger nail, with the strip stretching or otherwise conforming to the surface of the user's nail. The strip may be clear or otherwise allow curable energy to pass through the strip, such that UV-energy or other curing energy may be passed through the strip and interact with the uncured resin on the side of the strip that is in contact with the user's nail. The curing may be selective curing as described above, with the strip being removed after the curing step. One benefit of using such a system is that the resin may be easily applied to the strip in a uniform thickness, such that when the strip is applied to the user's nail, a uniform thickness of resin is deposited on the user's nail. Because the resin may be cured selectively, including prior to removing the strip, any uncured resin that is deposited onto the user's skin outside the boundary of the nail may be easily removed as described above.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A nail polish application system comprising:
   a nail polish applicator configured to apply a curable nail polish to a nail of a user;
   an energy source configured to emit energy to selectively cure the curable nail polish on the nail; and
   a sensor for detecting a boundary of the nail of the user, the sensor being operatively connected to the energy source.

2. The nail polish application system of claim 1, wherein the energy source is configured to direct the energy to (i) the detected boundary of the nail during a first curing stage or (ii) to an area within the detected boundary of the nail during the first curing stage, and to (iii) avoid directing the energy to area outside the detected boundary of the nail during the first curing stage.

3. The nail polish application system of claim 1, wherein the nail polish applicator is configured to apply droplets of the nail polish to the nail of the user.

4. The nail polish system of claim 1, further comprising a structured light system having a projector and light sensor configured to detect energy projected by the projector.

5. The nail polish system of claim 4, wherein the projector of the structured light system functions as the energy source, and the light sensor of the structured light system functions as the sensor.

6. The nail polish system of claim 4, wherein the structured light system is configured to assist in detecting curvature of the nail in a depth direction.

7. The nail polish system of claim 1, wherein the energy source includes a UV energy source and the nail polish is at least partially UV curable.

8. The nail polish system of claim 1, wherein the energy source includes at least one mirror capable of movement in at least one degree of freedom.

9. The nail polish system of claim 1, wherein the energy source further includes a UV energy source to apply UV energy in all directions to non-selectively cure the nail polish.

10. The nail polish application system of claim 1, wherein the sensor is configured to detect the boundary of the nail of the user periodically to update the detected boundary of the nail over time.

11. The nail polish application system of claim 1, wherein the sensor is configured to detect motion of a finger of the user, the finger containing the nail of the user, in order to (i) update a position of the boundary or (ii) update a shape of the boundary.

12. The nail polish application system of claim 1, further comprising a strip of material containing the curable nail polish thereon.

13. The nail polish application system of claim 12, wherein the curable nail polish on the strip of material is in an uncured state.

14. The nail polish application system of claim 12, wherein the strip of material is configured to conform to the nail of the user.

15. The nail polish application system of claim 12, wherein the curable nail polish on the strip is provided having a uniform thickness.

16. The nail polish application system of claim 12, wherein the curable nail polish is contained on a first side of the strip of material.

17. The nail polish application system of claim 16, wherein the strip of material is clear so that the energy source is capable of emitting energy through the strip of material from a second side of the strip of material to the first side of the strip of material to cure the curable nail polish contained thereon.

* * * * *